(12) United States Patent
Keane

(10) Patent No.: US 10,503,843 B2
(45) Date of Patent: Dec. 10, 2019

(54) SUPERVISED AUTOMATIC ROOF MODELING

(71) Applicant: Eagle View Technologies, Inc., Bothell, WA (US)

(72) Inventor: John Francis Keane, Kenmore, WA (US)

(73) Assignee: Eagle View Technologies, Inc., Bellevue, WA (US)

( * ) Notice: Subject to any disclaimer, the term of this patent is extended or adjusted under 35 U.S.C. 154(b) by 0 days.

(21) Appl. No.: 15/907,987

(22) Filed: Feb. 28, 2018

(65) Prior Publication Data

US 2019/0188337 A1    Jun. 20, 2019

Related U.S. Application Data

(60) Provisional application No. 62/607,590, filed on Dec. 19, 2017.

(51) Int. Cl.
*G06F 17/50* (2006.01)
*G06Q 10/06* (2012.01)
(Continued)

(52) U.S. Cl.
CPC ... *G06F 17/5004* (2013.01); *G06Q 10/06398* (2013.01); *G06Q 30/02* (2013.01);
(Continued)

(58) Field of Classification Search
CPC ............. G06F 17/5004; G06F 2217/02; G06F 221/06; G06Q 10/06398; G06T 17/05
(Continued)

(56) References Cited

U.S. PATENT DOCUMENTS

| 2,791,151 A | 5/1957 | Pennington |
| 3,617,016 A | 11/1971 | Bolsey |

(Continued)

FOREIGN PATENT DOCUMENTS

| AU | 742146 B2 | 12/2000 |
| AU | 2008230031 B8 | 11/2009 |

(Continued)

OTHER PUBLICATIONS

Rao_2001 (On Model Selection, IMS Lecture Notes—Monograph Series (2001) vol. 38).*

(Continued)

*Primary Examiner* — Brian S Cook
(74) *Attorney, Agent, or Firm* — Dunlap Codding, P.C.

(57) ABSTRACT

An automated method is disclosed that classifies a first component and a second component of a roof with data points being part of, or extracted from at least one image. The first component and the second component have a ridge, at least one eave parallel to the ridge and a rectangular base. Evidence of a soft constraint and a hard constraint is identified via the data points and such evidence is associated with the first component and the second component. At least one hypothesis model of the roof is generated using relationships between the first component and the second component, the soft constraint and the hard constraint. The hypothesis model is transformed into a three dimensional model, and the three dimensional model is used to generate a roof report of the roof.

18 Claims, 10 Drawing Sheets

(51) Int. Cl.
*G06Q 30/02* (2012.01)
*G06Q 50/08* (2012.01)
*G06Q 50/16* (2012.01)
*G06Q 30/06* (2012.01)
*G06T 7/00* (2017.01)
*G06T 17/00* (2006.01)
*G06T 17/05* (2011.01)

(52) U.S. Cl.
CPC ......... *G06Q 30/0611* (2013.01); *G06Q 50/08* (2013.01); *G06Q 50/16* (2013.01); *G06T 7/00* (2013.01); *G06T 17/00* (2013.01); *G06F 2217/02* (2013.01); *G06F 2217/06* (2013.01); *G06T 17/05* (2013.01)

(58) Field of Classification Search
USPC .............................................................. 703/1
See application file for complete search history.

(56) References Cited

U.S. PATENT DOCUMENTS

| | | |
|---|---|---|
| 5,247,356 A | 9/1993 | Ciampa |
| 5,379,105 A | 1/1995 | Iki et al. |
| 5,596,494 A | 1/1997 | Kuo |
| 5,633,946 A | 5/1997 | Lachinski et al. |
| 5,633,995 A | 5/1997 | McClain |
| 5,936,628 A | 8/1999 | Kitamura et al. |
| 5,983,010 A | 11/1999 | Murdock et al. |
| 6,246,412 B1 | 6/2001 | Shum et al. |
| 6,323,885 B1 | 11/2001 | Wiese |
| 6,333,749 B1 | 12/2001 | Reinhardt et al. |
| 6,385,541 B1 | 5/2002 | Blumberg et al. |
| 6,396,491 B2 | 5/2002 | Watanabe et al. |
| 6,446,053 B1 | 9/2002 | Elliott |
| 6,448,964 B1 | 9/2002 | Isaacs et al. |
| 6,496,184 B1 | 12/2002 | Freeman et al. |
| 6,636,803 B1 | 10/2003 | Hartz, Jr. et al. |
| 6,741,757 B1 | 5/2004 | Torr et al. |
| 6,760,117 B2 | 7/2004 | Slatter |
| 6,836,270 B2 | 12/2004 | Du |
| 6,980,690 B1 | 12/2005 | Taylor et al. |
| 7,003,400 B2 | 2/2006 | Bryant |
| 7,006,977 B1 | 2/2006 | Attra et al. |
| 7,133,551 B2 | 11/2006 | Chen et al. |
| 7,233,691 B2 | 6/2007 | Setterholm |
| 7,305,983 B1 | 12/2007 | Meder et al. |
| 7,324,666 B2 | 1/2008 | Zoken et al. |
| 7,327,880 B2 | 2/2008 | Tek |
| 7,333,963 B2 | 2/2008 | Widrow et al. |
| 7,343,268 B2 | 3/2008 | Kishikawa |
| 7,373,303 B2 | 5/2008 | Moore et al. |
| 7,376,284 B2 | 5/2008 | Tao et al. |
| 7,424,133 B2 | 9/2008 | Schultz et al. |
| 7,428,337 B2 | 9/2008 | Gao et al. |
| 7,460,214 B2 | 12/2008 | Schiavi |
| 7,487,114 B2 | 2/2009 | Florance et al. |
| 7,500,391 B2 | 3/2009 | Woro |
| 7,509,241 B2 | 3/2009 | Guo et al. |
| 7,519,206 B2 | 4/2009 | Mulet-Parada et al. |
| 7,583,275 B2 | 9/2009 | Neumann et al. |
| 7,629,985 B2 | 12/2009 | McArdle et al. |
| 7,639,842 B2 | 12/2009 | Kelle et al. |
| 7,728,833 B2 | 6/2010 | Verma et al. |
| 7,752,018 B2 | 7/2010 | Rahmes et al. |
| 7,787,659 B2 | 8/2010 | Schultz et al. |
| 7,844,499 B2 | 11/2010 | Yahiro et al. |
| 7,869,944 B2 | 1/2011 | Deaton et al. |
| 7,873,238 B2 | 1/2011 | Schultz et al. |
| 7,920,963 B2 | 4/2011 | Jouline et al. |
| 7,950,579 B2 | 5/2011 | Gray et al. |
| 7,953,690 B2 * | 5/2011 | Luo .................. G06N 5/003 348/143 |
| 7,991,226 B2 | 8/2011 | Schultz et al. |
| 7,995,799 B2 | 8/2011 | Schultz et al. |
| 7,995,862 B2 | 8/2011 | Tao et al. |
| 8,051,089 B2 | 11/2011 | Gargi et al. |
| 8,068,643 B2 | 11/2011 | Schultz et al. |
| 8,078,436 B2 | 12/2011 | Pershing et al. |
| 8,081,798 B2 | 12/2011 | Paglieroni et al. |
| 8,081,841 B2 | 12/2011 | Schultz et al. |
| 8,131,514 B2 | 3/2012 | Royan et al. |
| 8,145,578 B2 | 3/2012 | Pershing et al. |
| 8,170,840 B2 | 5/2012 | Pershing |
| 8,204,341 B2 | 6/2012 | Schultz et al. |
| 8,209,152 B2 | 6/2012 | Pershing |
| 8,233,666 B2 | 7/2012 | Schultz et al. |
| 8,385,672 B2 | 2/2013 | Giuffrida et al. |
| 8,401,222 B2 | 3/2013 | Thornberry et al. |
| 8,417,061 B2 | 4/2013 | Kennedy et al. |
| 8,437,554 B2 | 5/2013 | Kim et al. |
| 8,471,854 B2 | 6/2013 | Kelley et al. |
| 8,477,190 B2 | 7/2013 | Giuffrida et al. |
| 8,520,079 B2 | 8/2013 | Schultz et al. |
| 8,531,472 B2 | 9/2013 | Freund et al. |
| 8,538,151 B2 | 9/2013 | Shimamura et al. |
| 8,538,918 B1 | 9/2013 | Pearcy et al. |
| 8,588,547 B2 | 11/2013 | Giuffrida et al. |
| 8,593,518 B2 | 11/2013 | Schultz et al. |
| 8,624,920 B2 | 1/2014 | Fujinaga |
| 8,670,961 B2 | 3/2014 | Pershing et al. |
| 8,818,770 B2 | 8/2014 | Pershing |
| 8,825,454 B2 | 9/2014 | Pershing |
| 9,129,376 B2 | 9/2015 | Pershing |
| 9,135,737 B2 | 9/2015 | Pershing |
| 2002/0010594 A1 | 1/2002 | Levine |
| 2002/0101594 A1 | 8/2002 | Slatter |
| 2002/0143669 A1 | 10/2002 | Scheer |
| 2002/0154174 A1 | 10/2002 | Redlich et al. |
| 2003/0014224 A1 * | 1/2003 | Guo .................. G06F 17/5004 703/1 |
| 2003/0028393 A1 | 2/2003 | Coulston et al. |
| 2003/0103651 A1 | 6/2003 | Novak |
| 2003/0115163 A1 | 6/2003 | Moore et al. |
| 2003/0171957 A1 | 9/2003 | Watrous |
| 2003/0233310 A1 | 12/2003 | Stavrovski |
| 2004/0047498 A1 | 3/2004 | Mulet-Parada et al. |
| 2004/0105090 A1 | 6/2004 | Schultz et al. |
| 2004/0105573 A1 | 6/2004 | Neumann et al. |
| 2004/0128313 A1 | 7/2004 | Whyman |
| 2004/0220906 A1 | 11/2004 | Gargi et al. |
| 2005/0129306 A1 | 6/2005 | Wang et al. |
| 2005/0203768 A1 | 9/2005 | Florance et al. |
| 2005/0267657 A1 | 12/2005 | Devdhar |
| 2005/0288959 A1 | 12/2005 | Eraker et al. |
| 2006/0061566 A1 | 3/2006 | Verma et al. |
| 2006/0137736 A1 | 6/2006 | Nishitani et al. |
| 2006/0169775 A1 | 8/2006 | Gray et al. |
| 2006/0200311 A1 | 9/2006 | Arutunian et al. |
| 2006/0232605 A1 | 10/2006 | Imamura |
| 2006/0235611 A1 | 10/2006 | Deaton et al. |
| 2006/0262112 A1 | 11/2006 | Shimada |
| 2006/0265287 A1 | 11/2006 | Kubo |
| 2007/0058850 A1 | 3/2007 | Luo et al. |
| 2007/0081714 A1 | 4/2007 | Wallack et al. |
| 2007/0150366 A1 | 6/2007 | Yahiro et al. |
| 2007/0179757 A1 | 8/2007 | Simpson |
| 2007/0220174 A1 | 9/2007 | Abhyanker |
| 2008/0021683 A1 | 1/2008 | Rahmes et al. |
| 2008/0089610 A1 | 4/2008 | Tao et al. |
| 2008/0105045 A1 | 5/2008 | Woro |
| 2008/0123994 A1 | 5/2008 | Schultz et al. |
| 2008/0162380 A1 | 7/2008 | Suga et al. |
| 2008/0204570 A1 | 8/2008 | Schultz et al. |
| 2008/0221843 A1 | 9/2008 | Shenkar et al. |
| 2008/0231700 A1 | 9/2008 | Schultz et al. |
| 2008/0262789 A1 | 10/2008 | Pershing et al. |
| 2008/0273753 A1 | 11/2008 | Giuffrida et al. |
| 2008/0310756 A1 | 12/2008 | Tao et al. |
| 2009/0046759 A1 | 2/2009 | Lee et al. |
| 2009/0085915 A1 | 4/2009 | Kelley et al. |
| 2009/0096884 A1 | 4/2009 | Schultz et al. |
| 2009/0097744 A1 | 4/2009 | Schultz et al. |
| 2009/0132210 A1 | 5/2009 | Royan et al. |

(56) References Cited

U.S. PATENT DOCUMENTS

| | | | |
|---|---|---|---|
| 2009/0132436 | A1 | 5/2009 | Pershing et al. |
| 2009/0141020 | A1 | 6/2009 | Freund et al. |
| 2009/0216552 | A1 | 8/2009 | Watrous |
| 2009/0225026 | A1 | 9/2009 | Sheba |
| 2009/0304227 | A1 | 12/2009 | Kennedy et al. |
| 2010/0034483 | A1 | 2/2010 | Giuffrida et al. |
| 2010/0110074 | A1* | 5/2010 | Pershing ............ G06F 17/5004 345/423 |
| 2010/0114537 | A1 | 5/2010 | Pershing |
| 2010/0179787 | A2 | 7/2010 | Pershing et al. |
| 2010/0241406 | A1 | 9/2010 | Rahmes et al. |
| 2010/0266693 | A1 | 11/2010 | Thornberry et al. |
| 2010/0302243 | A1 | 12/2010 | Schultz et al. |
| 2011/0086201 | A1 | 4/2011 | Shiao et al. |
| 2011/0091075 | A1 | 4/2011 | Schultz et al. |
| 2011/0091076 | A1 | 4/2011 | Schultz et al. |
| 2011/0096083 | A1 | 4/2011 | Schultz |
| 2011/0102461 | A1 | 5/2011 | Schultz et al. |
| 2011/0205245 | A1 | 8/2011 | Kennedy et al. |
| 2011/0216962 | A1 | 9/2011 | Kim et al. |
| 2012/0007982 | A1 | 1/2012 | Giuffrida et al. |
| 2012/0035887 | A1 | 2/2012 | Augenbraun et al. |
| 2012/0066187 | A1 | 3/2012 | Pearcy et al. |
| 2012/0170797 | A1 | 7/2012 | Pershing et al. |
| 2012/0191424 | A1 | 7/2012 | Pershing |
| 2012/0209782 | A1 | 8/2012 | Pershing et al. |
| 2012/0223965 | A1 | 9/2012 | Pershing |
| 2012/0224770 | A1 | 9/2012 | Strassenburg-Kleciak |
| 2013/0202157 | A1 | 8/2013 | Pershing |
| 2013/0204575 | A1 | 8/2013 | Pershing |
| 2013/0216089 | A1 | 8/2013 | Chen et al. |
| 2013/0226515 | A1 | 8/2013 | Pershing et al. |
| 2013/0262029 | A1* | 10/2013 | Pershing ................ G06Q 10/06 702/156 |
| 2013/0311240 | A1 | 11/2013 | Pershing et al. |
| 2013/0346020 | A1 | 12/2013 | Pershing |
| 2014/0046627 | A1 | 2/2014 | Pershing |
| 2014/0177945 | A1 | 6/2014 | Pershing et al. |
| 2014/0279593 | A1 | 9/2014 | Pershing |
| 2015/0015605 | A1 | 1/2015 | Pershing |
| 2015/0016689 | A1 | 1/2015 | Pershing |
| 2015/0370928 | A1 | 12/2015 | Pershing |
| 2015/0370929 | A1 | 12/2015 | Pershing |
| 2017/0091319 | A1* | 3/2017 | Legrand ............ G06F 17/30994 |

FOREIGN PATENT DOCUMENTS

| | | | |
|---|---|---|---|
| CA | 2191954 | A1 | 12/1995 |
| CN | 102194120 | A | 9/2011 |
| DE | 198 57 667 | A1 | 8/2000 |
| EP | 1 010 966 | B1 | 10/2002 |
| EP | 1 619 610 | A1 | 1/2006 |
| EP | 2 251 833 | A2 | 11/2010 |
| WO | WO 00/29806 | A2 | 5/2000 |
| WO | WO 2005/124276 | A2 | 12/2005 |
| WO | WO 2006/040775 | A2 | 4/2006 |
| WO | WO 2006/090132 | A2 | 8/2006 |
| WO | WO 2009/046459 | A1 | 4/2009 |
| WO | WO 2011/094760 | A2 | 8/2011 |

OTHER PUBLICATIONS

Constrained_Optimization_2017 Archived Wikipedia Article dated Jun. 3, 207 downloaded from https://en.wikipedia.org/w/index.php?title=Constrained_optimization&oldid=783552818.*
Rao_2001 (On Model Selection, IMS Lecture Notes—Monograph Series (2001) vol. 38). (Year: 2001).*
Constrained_Optimization_2017 Archived Wikipedia Article dated Jun. 3, 207 downloaded from https://en.wikipedia.org/w/index.php?title=Constrained_optimization&oldid=783552818 (Year: 2017).*
Arbib_1990 (Arbib, A. M., Schwartz L. E. Editor Schemas for High-Level Vision: The Problem of Instantiation, Computational Neuroscience Chapter 26 MIT Press, 1990) (Year: 1990).*
"Pictometry Online Demo" Transcript,Transcription of points of potential interest in the attached YouTube video retrieved Feb. 25, 2010, 9 pages.
Able Software Corp, "R2V User's Manual, Advanced Raster to Vector Conversion Software," Publicly available Sep. 16, 2000, Able Software Corp., Lexington, MA, 164 pages.
AeroDach, "Protokoll zur Dachauswertung," 12 pages.
AeroDach, AeroDach® Online Roof Evaluation Standard Delivery Format and 3D Data File,Document Version 01.00.2002 with alleged publication in 2002, 21 pages.
Aerowest GmbH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.
Aerowest GmbH, "AeroDach® Online Dachauswertung: Standardlieferformat und 3D-Datensatz," Aerowest GmbH, Version 01.00.2002, 6 pages.
Aerowest GmbH, "Aerowest Pricelist of Geodata," 2 pages.
Aerowest GmbH, "Geodata Service; AeroDach—Patented Roof Dimensions," retrieved on Mar. 25, 2012, from URL=http://web.archive.org/web/20060101021543/http://www.aerowest.de/aerodach.html, 2 pages.
Aerowest GmbH, "Preisliste Geodaten Aerowest," 1 page.
Aerowest GmbH, "Aerodach® Online Roof Analysis: Standard Delivery Format and 3D Dataset," AEROWESTGmbH, Version as of 01.00.2002, 6 pages.
Agarwal et al., "Building Rome in a Day," Communications of the ACM 54(10): 105-112.
Agarwal et al., "Reconstructing Rome," IEEE Computer 43(6): 40-47.
Agarwala et al., "Interactive Digital Photomontage," ACM SIGGRAPH 2004, Los Angeles, CA, 9 pages.
Agarwala et al., "Panoramic Video Textures," SIGGRAPH 2005, Los Angeles, CA, 8 pages.
American Congress on Surveying and Mapping, "Definitions of Surveying and Associated Terms," American Congress on Surveying and Mapping, reprinted 1989, p. 3, 2 pages.
American Society of Civil Engineering, "Glossary of the Mapping Sciences," American Society of Civil Engineering, ASCE Publications, 1994, pp. 9-10, 3 pages.
Appli-Cad Australia, "Linear Nesting Reports," AppliCad Sample Reports, Jul. 18, 2000, 9 pages.
Appli-Cad Australia, "Roof Magician: Especially suited to single, shake and tile roofing," Sample Reports, Jun. 24, 2004, 13 pages.
Appli-Cad Australia, "Roof Wizard: Advanced Software for Roof Modeling and Estimating," Document Issue 1.0.0, Sep. 25, 2004, 10 pages.
Appli-Cad Australia, "Roof Wizard: Especially suited to metal roofing," Generate Offcuts Reports, Mar. 9, 2005, 7 pages.
Appli-Cad Australia, "Roof Wizard: Especially suited to metal roofing," Generate Offcuts Reports, Sep. 14, 2006, 7 pages.
Appli-Cad Australia, "Roof Wizard: Especially suited to metal roofing," Sample Reports, Jul. 13, 2004, 24 pages.
Appli-Cad Australia, "Sorcerer: Advanced Software for Roof Modeling and Estimating," Reference Guide Version 3, Sep. 8, 1999, 142 pages.
Appli-Cad Australia, "Sorcerer: Nobody builds roofs like this builds roofs," retrieved on Mar. 29, 2012, from URL=http://web.archive.org/web/2006021409237/http://www.applicad.com.au/product-features . . . , 2 pages.
Appli-Cad Australia, "Sorcerer: The complete solution for professional roof estimating," Demonstration Kit, Mar. 9, 2005, 15 pages.
Appli-Cad Australia, Roof Wizard: Especially suited to metal roofing, Sample Reports, Sep. 17, 2002, 12 pages.
AppliCad Roofing, AppliCad Roofing, sample report, dated Jul. 30, 2007, 1 page.
AppliCad Roofing, AppliCad Roofing, sample report, dated Mar. 2, 2005, 28 pages.
AppliCad USA, "Linear Nesting Reports," AppliCad Sample Reports, Nov. 25, 1999, 9 pages.
AppliCad, "Example Output and Brochures," retrieved on Apr. 16, 2012, from URL=http://www.applicad.com/au/product-reports.html, 2 pages.

(56) References Cited

OTHER PUBLICATIONS

AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modelling the Roof," retrieved on Apr. 16, 2012, from http://web.archive.org/web/20051220180228/http://www.applicad.com.au:80/product-bulletin-1.htm, Dec. 20, 2005, 3 pages.
AppliCad, "Roofing Software: Product Bulletin Section 1—Modelling the Roof," retrieved on Apr. 16, 2012, from http://web.archive.org/web/20030107054803/http://www.applicad.com.au:80/product-bulletin-1.htm, Jan. 7, 2003, 3 pages.
AppliCad, "Roofing Software: Product Bulletin Section 2—Modifying the Model," retrieved on Apr. 16, 2012, from http://web.archive.org/web/20051220172927/http://www.applicad.com.au:80/product-bulletin-2.htm, Dec. 20, 2005, 2 pages.
AppliCad, "RoofScape: Advanced Software for Roof Modelling and Estimating," Learning Guide (English Units), Revision 1.1, Aug. 2007, 48 pages.
Appli-Cad, "World Class Technology Leading the Way in Roofing Software," Product Bulletin, 97 pages.
AppliCad, Applicad webpage 2005 snip different color lines, AppliCad webpage 2005 snip different color lines, 1 page.
AppliCad, Sorcerer software screenshot, modified on Sep. 6, 2012, 1 page.
asprs.org, "Digital Photogrammetry: An Addendum to the Manual of Photogrammetry, Greve, (ed.), 1996," ASPRS Bookstore—Manuals http://web.archive.org/web/19980116141702/http:/www.asprs.org/asprs/publications/bookstore/manuals.html; Apr. 1996.
Atkinson, "Theory of Close Range Photogrammetry," Chapter 2, Section 1, Coordinate Transformations, retrieved on Oct. 21, 2013, from http://www.lems.brown.edu/vision/people/leymarie/Refs/Photogrammetry/Atkinson90/C . . . , 5 pages.
Autodesk, "Autodesk ImageModeler—Features," retrieved on Sep. 30, 2011, from http://usa.autodesk.com/adsk/servlet/index?siteiD=123112&id=115639 . . . , 1 page.
Avrahami et al., "Extraction of 3D Spatial Polygons Based on the Overlapping Criterion for Roof Extraction From Aerial Images," CMRT05. IAPRS, vol. XXXVI, Part 3/W24, pp. 43-48, Vienna, Austria, Aug. 29-30, 2005, 6 pages.
Awan, "Updating App Resources from server in iOS," http://stackoverflow.com/questions/15334155/updating-app-resources-from-server-in-ios, 2 pages.
Azuma et al., "View-dependent refinement of multiresolution meshes with subdivision connectivity," Proceedings of the Second International Conference on Computer Graphics, Virtual Reality, Visualization, and Interaction (Afigraph 2003), Capetown, South Africa, Feb. 2003, pp. 69-78.
Baillard et al., "Automatic reconstruction of piecewise planar models from multiple views," CVPR99, vol. 2, 1999, pp. 559-565., 7 pages.
Bazaraa et al., Nonlinear Programming Theory and Algorithms, Second Edition, John Wiley & Sons, Inc., New York, 1993, 330 pages.
Berard, Declaration of Lynn Berard, In re Inter Partes Review of U.S. Pat. No. 8,078,436, dated Aug. 24, 2016, 4 pages.
Bertan et al., "Automatic 3D Roof Reconstruction using Digital Cadastral Map, Architectural Knowledge and an Aerial Image," IEEE International Conference on Geoscience and Remote Sensing Symposium, Sep. 2006, pp. 1407-1410, 4 pages.
Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.
Bhat et al., "Fourier Analysis of the 2D Screened Poisson Equation for Gradient Domain Problems," ECCV 2008, 10 pages.
Bhat et al., "GradientShop: A Gradient-Domain Optimization Framework for Image and Video Filtering," ACM TOG 29(2), Mar. 2010, 14 pages.
Bhat et al., "Piecewise Image Registration in the Presence of Large Motions," CVPR 2006, New York, NY, Jun. 2006, 7 pages.
Bhat et al., "Using Photographs to Enhance Videos of a Static Scene," Eurographics Symposium on Rendering 2007, 12 pages.
Bignone et al., "Automatic Extraction of Generic House Roofs from High Resolution Aerial Imagery," Proc. ECCV, 1996, 12 pages.
Börlin, "3D Reconstruction," https://www8.cs.umu.se/kurser/TDBD19/VT05/reconstruct-4.pdf, 5 pages.
Brooks et al., "A Review of Position Tracking Methods," 1st International Conference on Sensing Technology, Palmerston North, New Zealand, Nov. 21-23, 2005, pp. 54-59, 6 pages.
Cabeo: Library Catalog, Marc Record, for Hsieh, "Design and Evaluation of a Semi-Automated Site Modeling System," Digital Mapping Laboratory, School of Computer Science, Carnegie Mellon University, Pittsburgh, PA, CMU-CS-95-195, Nov. 1995, 76 pages, retrieved on Aug. 17, 2016, from http://search.library.cm.u.edu/vufind/Record/465462/Details#tabnav, 3 pages.
Canada Intellectual Property Office, Canadian Office Action for Canadian Application No. 2,641,373, dated Sep. 24, 2013, 4 pages.
Canada Intellectual Property Office, Canadian Office Action for Canadian Application No. 2,703,423, dated Mar. 24, 2014, 2 pages.
Canada Intellectual Property Office, Canadian Office Action, for Canadian Application No. 2,641,373, dated Jan. 9, 2012, 4 pages.
Capell et al., "A Multiresolution Framework for Dynamic Deformations," Computer Science & Engineering Technical Report, UW-CSE-02-04-02, University of Washington, Seattle, WA, Apr. 2002, 8 pages.
Charaniya, "3D Urban Reconstruction from Aerial LiDAR data," University of California, Santa Cruz, Computer Science, 2004, 44 pages.
Chevrier et al., "Interactive 3D reconstruction for urban areas—An image based tool," CAAD Features, 2001, 13 pages.
Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Shadow Matting and Compositing," SIGGRAPH 2003, San Diego, CA, Jul. 2003, 7 pages.
Ciarcia et al., U.S. Appl. No. 12/590,131, filed Nov. 2, 2009, 74 Pages.
Ciarcia, U.S. Appl. No. 13/646,466, filed Oct. 5, 2012, 41 pages.
Cohasset, "Town Report," 2008, pp. 1-3 and 27, 4 pages.
Colburn et al., "Image-Based Remodeling," IEEE Transactions on Visualization and Computer Graphics, vol. 19, No. 1, Jan. 2013, 11 pages.
Collins et al., "The Ascender System: Automated Site Modeling from Multiple Aerial Images," Computer Vision and Image Understanding 72(2):143-162, 1998.
Curless et al., "A Volumetric Method for Building Complex Models from Range Images," SIGGRAPH '96, New Orleans, LA, Aug. 4-9, 1996, 10 Pages.
Curless et al., "Better Optical Triangulation Through Spacetime Analysis," Computer Systems Laboratory Technical Report CSL-TR-95-667, Stanford University, Stanford, CA, Apr. 1995, 12 pages.
Curless et al., "Computer model and 3D fax of Happy Buddha," retrieved Oct. 25, 2013, from http://www-graphics.stanford.edu/projects/faxing/happy/, 4 pages.
Curless, "From Range Scans to 3D Models," ACM SIGGRAPH Computer Graphics 33(4):38-41, 1999.
Curless, "New Methods for Surface Reconstruction from Range Images," Dissertation, Submitted to the Department of Electrical Engineering and the Committee of Graduate Studies of Stanford University, Jun. 1997, 209 pages.
Debevec et al., "Modeling and Rendering Architecture from Photographs: A hybrid geometry- and image-based approach," SIGGRAPH conference proceedings, retrieved from www.cs.berkeley.edu/~malik!papers/debevecTM96.pdf., 1996, 10 Pages.
Delaney, "Searching for Clients From Above—More Small Businesspeople Use Aerial Mapping Services to Scout Potential Cus-

(56) References Cited

OTHER PUBLICATIONS tomers," The Wall Street Journal, Jul. 31, 2007, retrieved on http://online.wsj.com/public/article/SB118584306224482891.html?mod=yahoo free, 3 pages.
directionmag.com, "Pictometry Announces Technical Advancements for GIS Professionals," Dec. 7, 2006, retrieved from http://www.directionsmag.com/pressreleases/pictometry-announces-technical-advancements . . . , retrieved on Sep. 7, 2016, 10 pages.
Drawing, 1 page.
*Eagle View Tech.* v. *Aerialogics LLC*, "Prior Art Presentation," Case No. 2:12-cv-00618-RAJ, 61 pages.
Eagle View Technolgies and AppliCad Software, "AppliCad Software and Eagle View® Technologies Partner for Metal Roofing Contractors," retrieved on Feb. 1, 2012 from blog.eagleview.com/?=614, Feb. 4, 2011, 2 pages.
ECE 390, "Introduction to Optimization," Spring 2004, Introductory Course, retrieved Oct. 25, 2013, from http://liberzon.csl.illinois.edu/04ECE390.html, 1 page.
Falkner et al., "Aerial Mapping 2nd Edition," Lewis Publishers (CRC Press LLC), 2002, "Chapter 11—Aerotriangulation," 23 pages.
Faugeras et al., "3-D Reconstruction of Urban Scenes from Sequences of Images," Institut National De Recherche En Informatique Et En Automatique, No. 2572, Jun. 1995, 27 pages.
Faugeras, "What can be seen in three dimensions with an uncalibrated stereo rig?," Computer Vision—ECCV '92: 563-578, 1992., 18 pages.
Fisher et al., Dictionary of Computer Vision and Image Processing, John Wiley & Sons, Ltd., West Sussex, England, 2005, 182 pages.
Forlani et al., "Complete classification of raw LIDAR data and 3D reconstruction of buildings," Pattern Anal Applic 8:357-374, 2006, 18 pages.
Francica et al., "Microsoft's MSN Virtual Earth: The Map is the Search Platform," Directions Magazine URL=http://www.directionsmag.com/article.php?article_id=873&trv=1, retrieved Feb. 6, 2009, 10 pages.
Fritsch, "Introduction into Digital Aerotriangulation," Photogrammetric Week '95, Wichman Verlag, Heidelberg, 1995, pp. 165-171, 7 pages.
Furukawa et al., "Manhattan-world Stereo," CVPR 2009, Miami, Florida, Jun. 2009, 8 pages.
Furukawa et al., "Reconstructing Building Interiors from Images," ICCV 2009, Kyoto, Japan, Sep. 2009, 8 pages.
Furukawa et al., "Towards Internet-scale Multi-view Stereo," CVPR 2010, Jun. 2010, 8 pages.
Georgeiv et al., "Spatio-Angular Resolution Tradeoff in Integral Photography," Proceedings of Eurographics Symposium on Rendering, 2006, 10 pages.
Geospan Corporation, "Digital Geo-Referenced Oblique Aerial Imagery Solution EPP-REP No. 8444 5/13," GEO-NY0000868, 2007, 28 pages.
Geospatial Information Systems Council, "Pictometry: Oblique Imagery training," 2009, retrieve on Sep. 7, 2016, from http://www.ct.gov/gis/cwp/view.asp?q=425874&a=3033&pp=3, 3 pages.
German AeroDach Web Site, http://www.aerodach.de,www.archive.org Web site showing alleged archive of German AeroDach Web Site from Jun. 13, 2004 (retrieved Sep. 20, 2012) and translations to English, 21 pages.
German AeroDach Web Site, http://aerowest.de/,www.archive.org Web site showing alleged archive of German Aerowest Web site from Feb. 6, 2006 (retrieved Sep. 20, 2012) and translated to English, 61 pages.
GIS, GIS Working Group Meeting Minutes, 16 pages.
Gisuser, "Los Angeles County Extends its License Agreement with Pictometry for New Oblique Aerial Photos," retrieved from http://www.directionsmag.com/pressreleases/los-angeles-county-extends-its-license-agree . . . , retrieved on Sep. 15, 2016, 4 pages.
Gisuser, "Pictometry Announces Technical Advancements for GIS Professionals," Dec. 5, 2006, retrieved on Sep. 15, 2016, from http://gisuser.com/2006/12/pictometry-announces-technical-advancements-for-gis-professi . . . , 15 pages.
Gleicher, "Image Snapping," Advanced Technology Group, Apple Computer, Inc., pp. 183-190, 1995.
Goesele et al., "Multi-View Stereo Revisited," CVPR 2006, New York, NY, Jun. 2006, 8 pages.
Goesele et al., "Multi-View Stereo for Community Photo Collections," Proceedings of ICCV 2007, Rio de Janeiro, Brazil, Oct. 2007, 8 pages.
Goldman et al., "Interactive Video Object Annotation," Computer Science & Engineering Technical Report, UW-CSE-07-04-01, University of Washington, Seattle, WA, Apr. 2007, 7 pages.
Goldman et al., "Schematic Storyboarding for Video Editing and Visualization," SIGGRAPH 2006, Boston, MA, Aug. 2006, 10 pages.
Goldman et al., "Shape and Spatially-Varying BRDFs From Photometric Stereo," ICCV 2005, Beijing, China, Oct. 2005, 8 pages.
Goldman et al., "Shape and Spatially-Varying BRDFs From Photometric Stereo," IEEE Transactions on Pattern Analysis and Machine Intelligence, vol. 32, No. 6, Jun. 2010, 12 pages.
Goldman et al., "Video Object Annotation, Navigation, and Composition," UIST 2008, 10 pages.
Gonzalez et al., Digital Image Processing, Addison-Wesley Publishing Company, Inc., Reading, Massachusetts, 1993, 372 pages.
Google, "Photo Tours Google," http://www.google.com/search?q=photo+tours=google, 2 pages.
Grimm, Affidavit Attesting to the Accuracy of the Attached "Aerowest" Translation Under 37 C.F.R. §§ 42.2, 42.63(b), and/or 1.68, 1 page.
Gülch et al., "On the Performance of Semi-Automatic Building Extraction," In the International Archives of Photogrammetry and Remote Sensing, vol. 23, 1998, 8 pages.
Gupta et al., "DuploTrack: A Real-time System for Authoring and Guiding Duplo Block Assembly," UIST 2012, Boston, MA, Oct. 2012, 13 pages.
Gupta et al., "Enhancing and Experiencing Spacetime Resolution with Video and Stills," ICCP 2009, San Francisco, CA, Apr. 2009, 9 pages.
Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.
Gupta et al., "Single Image Deblurring Using Motion Density Functions," ECCV 2010, Crete, Greece, Sep. 2010, 14 pages.
Hartley et al., "2.4 A Hierarchy of Transformations," Multiple View Geometry in Computer Vision, Cambridge University Press, Second Edition, 2003, 9 pages.
Hartley et al., "8. Epipolar Geometry and the Fundamental Matrix," Multiple View Geometry in Computer Vision, Richard Hartley and Andrew Zisserman, Cambridge University Press, Jun. 2000. http://www.robtos.ox.ac.ul/~vgg/hzbook/hzbook1/HZepipolar.pdf, 25 pages.
Hartley et al., "Appendix 6: Iterative Estimation Methods," Multiple View Geometry in Computer Vision, Cambridge University Press, Second Edition, 2003, 34 pages.
Hartley et al., "Invariant and Calibration-Free Methods in Scene Reconstruction and Object Recognition," Final Technical Report, Feb. 28, 1997, 266 pages.
Hartley et al., Multiple View Geometry in Computer Vision,Second Edition, Cambridge University Press, Cambridge, England, 2003, 672 pages.
Held et al., "3D Puppetry: A Kinect-based Interface for 3D Animation," UIST 2012, Boston, MA, Oct. 2012, 11 pages.
Henricsson et al., "3-D Building Reconstruction with ARUBA: A Qualitative and Quantitative Evaluation," Institute of Geodesy and Photogrammetry, Swiss Federal Institute of Technology, 2001, 13 pages.
Henricsson et al., "Project Amobe: Strategies, Current Status and Future Work," International Archives of Photogrammetry and Remote Sensing, vol. XXXI, Part B3, Vienna, pp. 321-330, 1996, 10 pages.
Henricsson, "Automatic House Reconstruction," retrieved on Sep. 29, 2008, from http://www.vision.ee.ethz.ch/projects/Amobe_I/recons.html, 7 pages.

(56) References Cited

OTHER PUBLICATIONS

Hsieh, "Design and Evaluation of a Semi-Automated Site Modeling System," Technical Report CS-95-195, Carnegie Mellon University, Nov. 1995, 84 pages.

Hsieh, "SiteCity: A Semi-Automated Site Modelling System," Proceedings of the IEEE Computer Society Conference on Computer Vision and Pattern Recognition, Jun. 18-20, 1996, San Francisco, California, pp. 499-506.

Hudson, "Merging VRML Models: Extending the Use of Photomodeller," Thesis, in TCC 402, Presented to the Faculty of the School of Engineering and Applied Science, University of Virginia, Mar. 23, 1998, 23 pages.

IP Australia, Australian Office Action for Australian Application No. 2010201839, dated Apr. 14, 2011, 2 pages.

IP Australia, Australian Office Action for Australian Application No. 2010219392, dated Oct. 1, 2013, 4 pages.

IP Australia, Australian Office Action for Australian Application No. 2011210538, dated Jun. 21, 2013, 3 pages.

IP Australia, Australian Office Action for Australian Application No. 2013204089, dated Oct. 30, 2014, 5 pages.

ISPRS, ISPRS Archives—vol. XXXVI-3/W24, retrieved on Sep. 7, 2016, from http://www.isprs.org/proceedings/XXXVI/3-W24/, 5 pages.

ISPRS, Table containing all archives of the International Archives of the Photogrammetry, Remote Sensing and Spatial Information Sciences, retrieved on Sep. 7, 2016 from http://www.isprs.org/publications/archives.aspx, 11 pages.

Jaynes et al., "Recognition and reconstruction of buildings from multiple aerial images," Computer Vision and Image Understanding 90:68-98, 2003.

Kolman, "Chapter 4, Linear Transformations and Matrices, 4.1: Definition and Examples," Elementary Linear Algebra, Second Edition, Macmillan Publishing Co. Inc., 1977, 12 pages.

KP Building Products, "Vinyl Siding Estimating and Installation Guide," ICRA 2011, Shanghai, China, May 2011, 32 pages.

Krainin et al., "Autonomous Generation of Complete 3D Object Models Using Next Best View Manipulation Planning," ICRA 2011, Shanghai, China, May 2011, 7 pages.

Kushal et al., "Photo Tours," 3DimPVT, Oct. 2012, 8 pages.

Läbe et al., "Robust Techniques for Estimating Parameters of 3D Building Primitives," International Society for Photogrammetry and Remote Sensing vol. 32, Part 2, Commission II, Proceedings of the Commission II Symposium, Data Integration Techniques, Jul. 13-17, 1998, 16 pages.

LAR-IAC, LARIAC1 Pictometry Training, retrieved on Sep. 15, 2016, from http://egis3.lacounty.gov/dataportal/lariac/lariac-archives/lariac1-archive/lariac1-pictometr . . . , 1 page.

LAR-IAC, LAR-IAC2 Product Guide, for the Los Angeles Region Imagery Acquisition Consortium (LAR-IAC) Program, Sep. 2008, 16 pages.

Levoy et al., "The Digital Michelangelo Project: 3D Scanning of Large Statues," SIGGRAPH 2000, New Orleans, LA, Jul. 24-28, 2000, 14 pages.

Levoy, "The Digital Michelangelo Project," retrieved on Oct. 25, 2013, from http://www.graphics.stanford.edu/projects/mich/, 10 pages.

Lexisnexis, "Software; New Products," LexisNexis Roofing Contractor article 23(2):121(2), Jan. 3, 2006, 1 page.

Li et al., "Automated Generation of Interactive 3D Exploded View Diagrams," ACM Transactions on Graphics 27(3), SIGGRAPH 2007, Aug. 2007, 7 pages.

Li et al., "Interactive Cutaway Illustration of Complex 3D Models," ACM Transactions on Graphics 26(3), SIGGRAPH 2007, Aug. 2007, 11 pages.

Library of Congress, MARC 21 Bibliographic, "005—Data and Time of Latest Transaction (NR)," Library of Congress, Feb. 1999, retrieved on Sep. 8, 2016, from http://www.loc.gov/marc/bibliographic/bd005.html, 2 pages.

Lueders, "Infringement Allegations by Eagle View Technologies," Feb. 10, 2009, 3 pages.

Mahajan et al., "A Theory of Frequency Domain Invariants: Spherical Harmonic Identities for BRDF / Lighting Transfer and Image Consistency," IEEE Pattern Analysis and Machine Intelligence, 30(2), Feb. 2008, 14 pages.

Mahajan et al., "A Theory of Spherical Harmonic Identities for BRDF/Lighting Transfer and Image Consistency," ECCV 2006, Graz, Austria, May 2006, 14 pages.

MAINERD14, "Pictometry Online Demo," retrieved on Feb. 6, 2009, from http://www.youtube.com/watch?v=jURSK7o0OD0, 1 page.

MAINERD14, "Pictometry Online Demo," YouTube, DVD.

Mann, "Roof with a view," Contract Journal 431(6552):29, Nov. 23, 2005, 2 pages.

McGlone et al., "Projective and Object Space Geometry for Monocular Building Extraction," IEEE Computer Society Conference on Computer Vision and Pattern Recognition, Jun. 21-23, 1994, Seattle, Washington, pp. 54-61.

McKeown et al., "Chapter 9: Feature Extraction and Object recognition, Automatic Cartographic Feature Extraction Using Photogrammetric Principles," in Digital Photogrammetry: An Addendum to the Manual of Photogrammetry, Greve, C., (ed.), Bethesda, Maryland, American Society for Photogrammetry and Remote Sensing, 1996, 19 pages.

Merriam-Webster, "Compass Bearing," Definition, 2 pages.

Mikhail et al., "Introduction to Modern Photogrammetry," John Wiley & Sons, Inc., New York, 2001, 247 pages.

Miller et al., "Miller's Guide to Framing and Roofing," McGraw Hill, New York, pp. 131-136 and 162-163, 2005, 9 pages.

Minialoff, "Introduction to Computer Aided Design," Apr. 2000, 4 pages.

Noronha et al., "Detection and Modeling of Buildings from Multiple Aerial Images," Institute for Robotics and Intelligent Systems, University of Southern California, May 1, 2001. 32 pages.

PCT/ISA, International Search Report and Written Opinion of the International Searching Authority for International Application No. PCT/US2013/024523, dated Nov. 11, 2013, 15 pages.

PCT/ISA, International Search Report for International Application No. PCT /US 11/23408, dated Aug. 11, 2011, 2 pages.

PCT/ISA, International Search Report for International Application No. PCT/US2013/023503, dated Apr. 30, 2013, 5 pages.

PCT/ISA, International Preliminary Report on Patentability for International Application No. PCT/US2011/023408, dated Aug. 16, 2012, 7 pages.

PCT/ISA, International Search Report and Written Opinion for International Application No. PCT/US2013/023502, dated Apr. 30, 2013, 8 pages.

PCT/ISA, Written Opinion for International Application No. PCT/US2013/023502, dated Apr. 30, 2013, dated Apr. 30, 2013, 3 pages.

PCT/ISA, Written Opinion for International Application No. PCT/US2013/023503, dated Apr. 30, 2013, dated Apr. 30, 2013, 4 pages.

PCT/ISA, Written Opinion, for International Application No. PCT /US11/23408, dated Aug. 11, 2011, 5 pages.

Perlant et al., "Scene Registration in Aerial Image Analysis," date of original version: 1989, retrieved on Sep. 7, 2016, from http://repository.cmu.edu/compsci/1859, 3 pages.

Perlant et al., "Scene Registration in Aerial Image Analysis," retrieved on Sep. 7, 2016, from http://proceedings.spiedigitallibrary.org/proceedings.aspx?articleid=1257182, Jul. 25, 1989, 3 pages.

Perlant et al., "Scene Registration in Aerial Image Analysis," Photogrammetric Engineering and Remote Sensing 56(4):481-493, Apr. 1990.

Pershing et al., Amendment for U.S. Appl. No. 13/287,954, dated Feb. 28, 2013, 14 pages.

Pershing et al., Amendment for U.S. Appl. No. 13/287,954, dated Nov. 22, 2013, 25 pages.

Pershing et al., Amendment for U.S. Appl. No. 14/195,543, dated Jun. 29, 2016, 13 pages.

Pershing et al., U.S. Appl. No. 61/197,072, filed Oct. 31, 2008, 32 pages.

Pershing et al., U.S. Appl. No. 61/197,895, filed Oct. 31, 2008, 32 pages.

Pershing et al., U.S. Appl. No. 60/925,072, filed Apr. 17, 2007, 16 pages.

(56) References Cited

OTHER PUBLICATIONS

Pershing et al., U.S. Appl. No. 61/300,414, filed Feb. 1, 2010, 22 pages.
Pershing, Amendment After Allowance for U.S. Appl. No. 14/450,108, dated Jul. 31, 2015, 14 pages.
Pershing, Amendment for U.S. Appl. No. 12/467,250, dated Nov. 30, 2011, 15 pages.
Pershing, Amendment for U.S. Appl. No. 13/474,504, dated Feb. 28, 2013, 13 pages.
Pershing, Amendment for U.S. Appl. No. 13/474,504, dated Nov. 19, 2013, 21 pages.
Pershing, Amendment for U.S. Appl. No. 13/474,504, dated Apr. 16, 2014, 9 pages.
Pershing, Amendment for U.S. Appl. No. 14/450,108, dated Jul. 1, 2015, 18 pages.
Pershing, U.S. Appl. No. 13/385,607, filed Feb. 3, 2012, 41 pages.
Pershing, U.S. Appl. No. 13/757,694, filed Feb. 1, 2013, 96 pages.
Pershing, U.S. Appl. No. 13/757,712, filed Feb. 1, 2013, 95 pages.
Pershing, U.S. Appl. No. 61/197,904, filed Oct. 31, 2008, 62 pages.
Photomodeler, "Measuring & Modeling the Real World," retrieved Sep. 30, 2008, from http://www.photomodeler.com/products/photomodeler.html, 2 pages.
Photomodeler, www.archive.org Web site showing alleged archive of PhotoModeler Web Site retrieved on Oct. 21, 2013, http://www.photomodeler.com/pmpro08.html from Feb. 9, 2006, 4 pages.
Pictometry Online, "Government," retrieved on Aug. 10, 2011, from http://web.archive.org/web/20081007111115/http:/www.pictometry.corn/government/prod . . . , 3 pages.
Pictometry, "Electronic Field Study™ Getting Started Guide," Version 2.7, Jul. 2007, 15 pages.
Pictometry, "FAQs," retrieved on Aug. 10, 2011, from http://www.web.archive.org/web/20080922013233/http:/www.pictometry.com/about_us/faqs.sht . . . , 3 pages.
Pictometry, "Frequently Asked Questions," retrieved on Feb. 10, 2012, from http://www.web.archive.org/web/20061223085009/http://pictometry.com/faq.asp, 6 pages.
Pictometry, "Pictometry—In the News," retrieved on Feb. 6, 2009, from URL=http://204.8.121.114/pressrelease%20archived/pressrelease aec.asp, Jan. 22, 2004, 3 pages.
Pictometry, "Electronic Field Study™ User Guide," Version 2.7, Jul. 2007, 537 pages.
Pictometry, "Oblique Image Library Instructions—Information for Utilization," 7 pages.
Pictometry, "Power Point Presentation," Apr. 19, 2007, 20 pages.
Pictometry, "Welcome to Your End User Training Power Point Presentation," 46 pages.
Pictometry, "Pictometry Administrative Training," 39 pages.
Pictometry, Pictometry Administrative Training, Handout, 1 page.
Pictometry, Pictometry Administrative Training, Metadata, 1 page.
Pictometry, Pictometry License Guidelines, 2 pages.
pictometry.com, "Frequently Asked Questions," http://replay.waybackmachine.org/20050801231818/http://www.pictometry.com/faq.asp, 10 pages.
pictometry.com, "Frequently Asked Questions," retrieved on Mar. 28, 2012, from URL=http://web.archive.org/web/20050524205653/http://pictometry.corn/faq.asp, 9 pages.
pictometry.com, "Frequently Asked Questions," retrieved on Aug. 1, 2005, from http://replay.waybackmachine.org/20050801231818/http:/1/www.pictometry.com/faq.asp, 10 pages.
pictometry.com, "Pictometry Announces Software and Web-based Solution for Engineers, Architects, and Planners," Press Releases, Jan. 22, 2004, 3 pages.
Poullis et al., Photogrammetric Modeling and Image-Based Rendering for Rapid Virtual Environment Creation, http://handle.dtic.mil/100.2/ADA433420, 1998, 7 pages.
precigeo.com, "Welcome to precigeo™," "Welcome to precigeoRoof," "Why precigeoRoof," "How precigeoRoofWorks," "How precigeoRoofCan Help Me," all retrieved on Feb. 26, 2010, from http://web.archive.org/, pp. 1-5; "Why precigeoRisk Works" and "Welcome to precigeoRisk," retrieved on Aug. 14, 2010, from http://web.archive.org, pp. 6-11. , 11 pages.
precigeo.com, "How precigeoRoof Works," retrieved on Apr. 30, 2009, from URL=http://web.archive.org/web/20070107012311/roof. precigeo.com/how-precigeo-roofworks.htm, 2 pages.
precigeo.com, "Welcome to precigeoRoof," retrieved on Apr. 30, 2009, from URL=http://web.archive.org/web/20070106063144/roof.precigeo.com, 1 page.
precigeo.com, "Welcome to precigeo™," retrieved on Feb. 17, 2009, from URL=http://web.archive.org/20080110074814/http://www. precigeo.com, 1 page.
PTAB, Decision—Denying Institution of Inter Partes Review 37 C.F.R. § 42.108, Case IPR2016-00582, *Xactware Solutions, Inc.*, v. *Eagle View Technologies, Inc.*, U.S. Pat. No. 8,078,436 B2, Aug. 16, 2016, 8 pages.
PTAB, Decision—Denying Petitioner's Request for Rehearing 37 C.F.R. § 42.71(d), Case IPR2016-00582, *Xactware Solutions, Inc.*, v. *Eagle View Technologies, Inc.*, U.S. Pat. No. 8,078,436 B2, Sep. 21, 2016, 4 pages.
PTAB, Decision—Denying Institution of Inter Partes Review 37 C.F.R. § 42.108, Case IPR2016-00586, *Xactware Solutions, Inc.*, v. *Eagle View Technologies, Inc.*, U.S. Pat. No. 8,170,840 B2, Aug. 16, 2016, 14 pages.
PTAB, Decision—Denying Institution of Inter Partes Review 37 C.F.R. § 42.108, Case IPR2016-00587, *Xactware Solutions, Inc.*, v. *Eagle View Technologies, Inc.*, U.S. Pat. No. 9,129,376 B2, Aug. 15, 2016, 13 pages.
PTAB, Decision—Institution of Inter Partes Review 37 C.F.R. § 42.108, Case IPR2016-00589, *Xactware Solutions, Inc.*, v. *Eagle View Technologies, Inc.*, U.S. Pat. No. 8,825,454 B2, Aug. 15, 2016, 20 pages.
PTAB, Decision—Institution of Inter Partes Review 37 C.F.R. § 42.108, Case IPR2016-00590, *Xactware Solutions, Inc.*, v. *Eagle View Technologies, Inc.*, U.S. Pat. No. 8,818,770 B2, Aug. 15, 2016, 18 pages.
PTAB, Decision—Institution of Inter Partes Review 37 C.F.R. § 42.108, Case IPR2016-00591, *Xactware Solutions, Inc.*, v. *Eagle View Technologies, Inc.*, U.S. Pat. No. 8,209,152 B2, Aug. 15, 2016, 19 pages.
Reddy et al., "Frequency-Space Decomposition and Acquisition of Light Transport under Spatially Varying Illumination," ECCV 2012, Florence, Italy, Oct. 2012, 15 pages.
RoofCad, "Satellite Takeoff Tutorial-Pitched Roof," 25 pages.
Scholze et al., "A Probabilistic Approach to Building Roof Reconstruction Using Semantic Labelling," Pattern Recognition 2449/2002, Springer Berlin/Heidelberg, 2002, 8 pages.
Schuch, Declaration of Harold Schuch in re Inter Partes Review of: U.S. Pat. No. 8,209,152, dated Feb. 5, 2016, 38 pages.
Schuch, Declaration of Harold Schuch in re Inter Partes Review of: U.S. Pat. No. 8,209,152, dated Oct. 5, 2016, 36 pages.
Schuch, Declaration of Harold Schuch, in re Inter Partes Review of U.S. Pat. No. 8,078,436, dated Feb. 5, 2016, 36 pages.
Schuch, Declaration of Harold Schuch, in re Inter Partes Review of U.S. Pat. No. 8,078,436, dated Sep. 12, 2016, 37 pages.
Schuch, Declaration of Harold Schuch, in re Inter Partes Review of U.S. Pat. No. 8,078,436, dated Oct. 4, 2016, 40 pages.
Schuch, Declaration of Harold Schuch, in re Inter Partes Review of U.S. Pat. No. 8,170,840, dated Feb. 5, 2016, 39 pages.
Schuch, Declaration of Harold Schuch, in re Inter Partes Review of U.S. Pat. No. 8,818,770, dated Feb. 5, 2016, 38 pages.
Schuch, Declaration of Harold Schuch, in re Inter Partes Review of U.S. Pat. No. 8,818,770, dated Oct. 5, 2016, 41 pages.
Schuch, Declaration of Harold Schuch, in re Inter Partes Review of U.S. Pat. No. 8,825,454, dated Feb. 5, 2016, 35 pages.
Schuch, Declaration of Harold Schuch, in re Inter Partes Review of U.S. Pat. No. 8,825,454, dated Oct. 5, 2016, 41 pages.
Schuch, Declaration of Harold Schuch, in re Inter Partes Review of U.S. Pat. No. 9,129,376, dated Feb. 5, 2016, 43 pages.
Schuch, Declaration of Harold Schuch, in re Inter Partes Review of U.S. Pat. No. 9,135,737, dated Feb. 5, 2016, 36 pages.

(56) References Cited

OTHER PUBLICATIONS

Schutzberg et al., "Microsoft's MSN Virtual Earth: The Map is the Search Platform," Directions Magazine retrieved on Feb. 6, 2009, from http://www.directionsmag.com/article.php?article id=873&trv= 1, 10 pages.

Seitz et al., "A Comparison and Evaluation of Multi-view Stereo Reconstruction Algorithms," CVPR 2006, New York, NY, Jun. 2006, 8 pages.

Sengül, "Extracting Semantic Building Models From Aerial Stereo Images and Conversion to Citygml," Thesis, Istanbul Technical University Institute of Science and Technology, May 2010, 138 pages.

Shahrabi, "Automatic Recognition and 3D Reconstruction of Buildings through Computer Vision and Digital Photogrammetry," Institut für Photogrammetrie der Universität Stuttgart, 2000. pp. 5-110.

Shan et al., "Refractive Height Fields from Single and Multiple Images," CVPR 2012, Providence, RI, Jun. 2012, 8 pages.

Shan et al., "Refractive Height Fields from Single and Multiple Images," CVPR 2012, Providence, RI, Jun. 2012, poster, 1 page.

SPIE, "About the SPIE Digital Library," http://spiedigitallibrary.org/ss/about.aspx, 3 pages.

SPIE, "Proceedings of SPIE," retrieved on Sep. 7, 2016, from http://proceedings.spiedigitallibrary.org/conferenceproceedings.aspx, 3 pages.

Steuer, "Height Snakes: 3D Building Reconstruction from Aerial Image and Laser Scanner Data," Joint Urban Remote Sensing Event, Munich, Germany, Apr. 11-13, 2011, pp. 113-116.

University of Washington, College of Arts & Sciences, Mathematics, Course Offerings, Autumn Quarter 2013 and Winter Quarter 2014, retrieved on Oct. 25, 2013 from http://www.washington.edu/students/crscat/math.html, 16 pages.

USPTO, Ex Parte Reexamination Ordered under 35 U.S.C. 257, for U.S. Pat. No. 8,078,436 C1,Ex Parte Reexamination Certificate (11th), Ex Parte Reexamination Ordered under 35 U.S.C. 257, for U.S. Pat. No. 8,078,436 C1, Pershing et al., "Aerial Roof Estimation Systems and Methods," certificate issued Aug. 27, 2014, 3 pages.

USPTO, Notice of Allowance for U.S. Appl. No. 12/253,092, dated Oct. 14, 2011, 26 pages.

USPTO, Notice of Allowance for U.S. Appl. No. 12/467,250, dated Feb. 16, 2012, 19 pages.

USPTO, Notice of Allowance for U.S. Appl. No. 13/019,228, dated Oct. 3, 2016, 7 pages.

USPTO, Notice of Allowance for U.S. Appl. No. 13/474,504, dated Jun. 13, 2014, 13 pages.

USPTO, Notice of Allowance for U.S. Appl. No. 14/450,108, dated Jun. 22, 2015, 15 pages.

USPTO, Notice of Allowance for U.S. Appl. No. 13/287,954, dated Dec. 19, 2013, 40 pages.

USPTO, Notice of Allowance for U.S. Appl. No. 13/438,288, dated Jun. 13, 2014, 12 pages.

USPTO, Notice of Allowance for U.S. Appl. No. 13/757,712, dated Dec. 26, 2013, 17 pages.

USPTO, Notice of Allowance for U.S. Appl. No. 13/757,712, dated Nov. 25, 2013, 37 pages.

USPTO, Notice of Allowance for U.S. Appl. No. 14/195,543, dated Aug. 26, 2016, 23 pages.

USPTO, Notice of Allowance for U.S. Appl. No. 12/590,131, dated Aug. 26, 2013, 9 pages.

USPTO, Notice of Allowance for U.S. Appl. No. 13/371,271, dated Jul. 29, 2013, 15 pages.

USPTO, Notice of Allowance for U.S. Appl. No. 12/148,439, dated Feb. 3, 2012, 35 pages.

USPTO, Notice of Allowance, for U.S. Appl. No. 12/467,244, dated Feb. 16, 2012, 20 pages.

USPTO, Office Action for U.S. Appl. No. 12/467,244, dated Aug. 26, 2011, 17 pages.

USPTO, Office Action for U.S. Appl. No. 12/467,250, dated Sep. 7, 2011, 14 pages.

USPTO, Office Action for U.S. Appl. No. 13/438,288, dated Dec. 16, 2013, 23 pages.

USPTO, Office Action for U.S. Appl. No. 13/474,504, dated Dec. 20, 2013, 24 pages.

USPTO, Office Action for U.S. Appl. No. 13/757,694, dated Oct. 8, 2013, 15 pages.

USPTO, Office Action for U.S. Appl. No. 13/757,712, dated Jul. 18, 2013 18 pages.

USPTO, Office Action for U.S. Appl. No. 13/843,437, dated Aug. 14, 2013, 9 pages.

USPTO, Office Action for U.S. Appl. No. 13/954,832, dated Sep. 12, 2016, 34 pages.

USPTO, Office Action for U.S. Appl. No. 14/450,108, dated Dec. 30, 2014, 32 pages.

USPTO, Office Action for U.S. Appl. No. 12/590,131, dated Jan. 9, 2013, 14 pages.

USPTO, Office Action for U.S. Appl. No. 13/287,954, dated Aug. 28, 2012, 12 pages.

USPTO, Office Action for U.S. Appl. No. 13/287,954, dated May 22, 2013, 25 pages.

USPTO, Office Action for U.S. Appl. No. 13/371,271, dated Oct. 10, 2012, 7 pages.

USPTO, Office Action for U.S. Appl. No. 13/438,288, dated May 21, 2013, 11 pages.

USPTO, Office Action for U.S. Appl. No. 13/438,288, dated Aug. 24, 2012, 8 pages.

USPTO, Office Action for U.S. Appl. No. 13/474,504, dated Jun. 19, 2013, 14 pages.

USPTO, Office Action for U.S. Appl. No. 13/474,504, dated Aug. 28, 2012, 8 pages.

USPTO, Office Action received in Reexamination of U.S. Pat. No. 8,078,436 B2, Supplemental Reexamination Patent, dated Jul. 25, 2013, 72 pages.

USPTO, Office Action received in Reexamination of U.S. Pat. No. 8,145,578 B2, Supplemental Reexamination Patent, dated Jul. 25, 2013, 24 pages.

USPTO, Office Action, for U.S. Appl. No. 12/148,439, dated Apr. 25, 2011, 52 pages.

USPTO, Office Action, for U.S. Appl. No. 12/148,439, dated Aug. 16, 2010, 47 pages.

USPTO, Office Action, for U.S. Appl. No. 12/148,439, dated Aug. 25, 2011, 77 pages.

USPTO, Office Action, for U.S. Appl. No. 12/253,092, dated May 10, 2011, 26 pages.

Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.

Weeks et al., "A Real-Time, Multichannel System with Parallel Digital Signal Processors," Proceedings of IEEE International Conference on Acoustics, Speech and Signal Processing (ICASSP 1990) 3: 1787-1790, Apr. 1990.

Wolf, "Elements of Photogrammetry," McGraw-Hill Kogakusha, 1974, "Chapter Fourteen: Aerotriangulation; 41-1 Intorduction" pp. 351-352, 3 pages.

Wood et al., "Surface Light Fields for 3D Photography," SIGGRAPH 2000, New Orleans, LA, Jul. 24-28, 2000, 10 pages.

Worldcat, "Digital Photogrammetry," FirstSearch: WorldCat Detailed Record (Staff View), retrieved on Oct. 3, 2016, from http://www.firstsearch.oclc.org/WebZ/FSFETCH?fetchtype=fullrecord:sessionid=fsappl-3 . . . , 8 pages.

Wu et al., "Multicore Bundle Adjustment," 8 pages.

Wu et al., "Schematic Surface Reconstruction," CVPR 2012, Providence, RI, Jun. 2012, 1 page.

Xactware Solutions, Inc. et al., Petition for Inter Partes Review of U.S. Pat. No. 8,078,436, issued Dec. 13, 2011, dated Feb. 8, 2016, 66 pages.

Xactware Solutions, Inc. et al., Petition for Inter Partes Review of U.S. Pat. No. 8,078,436, issued Dec. 13, 2011, dated Sep. 12, 2016, 67 pages.

Xactware Solutions, Inc. et al., Petition for Inter Partes Review of U.S. Pat. No. 8,078,436, issued Dec. 13, 2011, dated Oct. 5, 2016, 68 pages.

Xactware Solutions, Inc. et al., Second Corrected Petition for Inter Partes Review of U.S. Pat. No. 8,170,840, issued May 1, 2012, dated Apr. 8, 2016, 62 pages.

(56) References Cited

OTHER PUBLICATIONS

Xactware Solutions, Inc. et al., Corrected Petition for Inter Partes Review of U.S. Pat. No. 8,170,840, issued May 1, 2012, dated Feb. 18, 2016, 65 pages.
Xactware Solutions, Inc. et al., Petition for Inter Partes Review of U.S. Pat. No. 8,170,840, issued May 1, 2012, dated Feb. 8, 2016, 67 pages.
Xactware Solutions, Inc. et al., Petition for Inter Partes Review of U.S. Pat. No. 8,209,152, issued Jun. 26, 2012, dated Oct. 7, 2016, 50 pages.
Xactware Solutions, Inc. et al., Second Corrected Petition for Inter Partes Review of U.S. Pat. No. 8,209,152, issued Jun. 26, 2012, dated Apr. 8, 2016, 61 pages.
Xactware Solutions, Inc. et al., Petition for Inter Partes Review of U.S. Pat. No. 8,209,152, issued Jun. 26, 2012, dated Feb. 8, 2016, 65 pages.
Xactware Solutions, Inc. et al., Corrected Petition for Inter Partes Review of U.S. Pat. No. 8,209,152, issued Jun. 26, 2012, dated Feb. 24, 2016, 65 pages.
Xactware Solutions, Inc. et al., Petition for Inter Partes Review of U.S. Pat. No. 8,818,770, issued Aug. 26, 2014, dated Oct. 5, 2016, 68 pages.
Xactware Solutions, Inc. et al., Petition for Inter Partes Review of U.S. Pat. No. 8,818,770, issued Sep. 8, 2015, dated Feb. 8, 2016, 64 pages.
Xactware Solutions, Inc. et al., Petition for Inter Partes Review of U.S. Pat. No. 8,825,454, issued Sep. 2, 2014, dated Feb. 8, 2016, 47 pages.
Xactware Solutions, Inc. et al., Corrected Petition for Inter Partes Review of U.S. Pat. No. 8,825,454, issued Sep. 2, 2014, dated Feb. 23, 2016, 47 pages.
Xactware Solutions, Inc. et al., Petition for Inter Partes Review of U.S. Pat. No. 8,825,454, issued Sep. 2, 2014, dated Oct. 5, 2016, 63 pages.
Xactware Solutions, Inc. et al., Second Corrected Petition for Inter Partes Review of U.S. Pat. No. 9,129,376, issued Sep. 8, 2015, dated Apr. 8, 2016, 64 pages.
Xactware Solutions, Inc. et al., Corrected Petition for Inter Partes Review of U.S. Pat. No. 9,129,376, issued Sep. 8, 2015, dated Feb. 18, 2016, 66 pages.
Xactware Solutions, Inc. et al., Petition for Inter Partes Review of U.S. Pat. No. 9,129,376, issued Sep. 8, 2015, dated Feb. 8, 2016, 67 pages.
Xactware Solutions, Inc. et al., Petition for Inter Partes Review of U.S. Pat. No. 9,135,737, issued Sep. 15, 2015, dated Feb. 8, 2016, 67 pages.
*Xactware Solutions, Inc.* v. *Eagle View Technologies, Inc.*, Petitioner's Motion for Pro Hac Vice Admission of Scott S. Christie Under 37 C.F.R. § 42.10, Case IPR2016-00589, U.S. Pat. No. 8,825,454, Oct. 24, 2016, 6 pages.
*Xactware Solutions, Inc.* v. *Eagle View Technologies, Inc.*, Petitioner's Motion for Pro Hac Vice Admission of Scott S. Christie Under 37 C.F.R. § 42.10, Case IPR2016-00590, U.S. Pat. No. 8,818,770, Oct. 24, 2016, 6 pages.
*Xactware Solutions, Inc.* v. *Eagle View Technologies, Inc.*, Petitioner's Renewed Motion for Pro Hac Vice Admission of Scott S. Christie Under 37 C.F.R. § 42.10, Case IPR2016-00591, U.S. Pat. No. 8,209,152, Oct. 24, 2016, 6 pages.
*Xactware Solutions, Inc.* v. *Eagle View Technologies, Inc.*, Petitioner's Motion for Pro Hac Vice Admission of Scott S. Christie Under 37 C.F.R. § 42.10, Case IPR2016-00592, U.S. Pat. No. 9,135,737, Oct. 24, 2016, 6 pages.
*Xactware Solutions, Inc.* v. *Eagle View Technologies, Inc.*, Petitioner's Motion for Pro Hac Vice Admission of Scott S. Christie Under 37 C.F.R. § 42.10, Case IPR2016-01775, U.S. Pat. No. 8,078,436, Oct. 24, 2016, 6 pages.
*Xactware Solutions, Inc.* v. *Eagle View Technologies, Inc.*, Petitioner's Request for Rehearing—Decision—Denied, 37 C.F.R. § 42.71(d), Case IPR2016-00587, U.S. Pat. No. 9,129,376 B2, Sep. 30, 2016, 11 pages.
*Xactware Solutions, Inc.* v. *Pershing et al.*, Petitioner's Request for Rehearing Pursuant to 37 C.F.R. §§ 42.71 (c) and (d), Case IPR2016-00582, U.S. Pat. No. 8,078,436 B2, Sep. 9, 2016, 12 pages.
Xactware Solutions, Inc., Portions of File History, dated Oct. 25, 2013, for U.S. Reexamination Application No. 96/000,004, 225 pages.
Youtube, "Pictometry Online Webinar for MAIA Members," uploaded Apr. 8, 2011, retrieved from http://www.youtube.com/watch?v=RzAXK2avqQQ, 2 pages.
Zhang et al., "Rapid Shape Acquisition Using Color Structured Light and Multi-Pass Dynamic Programming," International Symposium on 3D Data Processing Visualization and Transmission, Padova, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.
Ziegler et al., "3D Reconstruction Using Labeled Image Regions," Mitsubishi Electric Research Laboratories, http://www.merl.com, Jun. 2003, 14 pages.
Zongker et al., "Environment Matting and Compositing," SIGGRAPH '99, Los Angeles, CA, Aug. 9-13, 1999, 10 pages.
Schultz, U.S. Appl. No. 60/425,275, filed Nov. 8, 2002, 32 pages.

\* cited by examiner

SUPERVISED AUTOMATIC ROOF MODELING

The present patent application claims priority to the U.S. Provisional Patent Application No. 62/607,590, filed Dec. 19, 2017, the entire content of which is hereby incorporated herein by reference.

BACKGROUND

Feature extraction within images holds a multitude of uses over multiple industries. For example, residential and/or commercial property owners approaching a major roofing project may be unsure of the amount of material needed and/or the next step in completing the project. Generally, such owners contact one or more contractors for a site visit. Each contractor must physically be present at the site of the structure in order to make a determination on material needs and/or time. The time and energy for providing such an estimate becomes laborious and may be affected by contractor timing, weather, contractor education, and the like. Estimates may be varied even between contractors in determination of estimated square footage causing variance in supply ordering as well. Additionally, measuring an actual roof may be costly and potentially hazardous—especially with steeply pitched roofs. Completion of a proposed roofing project may depend on ease in obtaining a simplified roofing estimate and/or obtaining reputable contractors for the roofing project.

Remote sensing technology has the ability to be more cost effective than manual inspection while providing pertinent information for assessment of roofing projects. Images are currently being used to measure objects and structures within the images, as well as to be able to determine geographic locations of points within the image when preparing estimates for a variety of construction projects, such as roadwork, concrete work, and roofing. See, for example, U.S. Pat. No. 7,424,133 that describes techniques for measuring within oblique images. Also see, for example, U.S. Pat. No. 8,145,578 that describe techniques for allowing the remote measurements of the size, geometry, pitch and orientation of the roof sections of the building and uses of the information to provide an estimate to repair or replace the roof, or to install equipment thereon. Estimating construction projects using software increases the speed at which an estimate is prepared, and reduces labor and fuel costs associated with on-site visits.

The identification of elements or features within an image, or even absent from an image, provides valuable information. Prior art methods of identification, however, waste time and energy, in addition to having variances between human extractors.

Prior methods of feature extraction and three-dimensional modeling from images required significant human interaction to view features within images depicting the roof and select points to form a wire-frame. Once the three-dimensional model is created, such model must also be sufficient precise in order to comply with geometric requirements of systems for viewing and/or manipulating such models. For example, three dimensional model representations transferred into a a general purpose CAD system or software likely require the vertex of a polygon exist to in the same plane only allowing for minimal tolerance. Generally, a technician imposes this coplanar requirement subsequent to formation of the three dimensional model from the images. For example, a three dimensional representation of an object is created, and then the system attempts to force the three-dimensional representation to be coplanar. Such methods, however, may warp the three-dimensional representation, and in addition, may require significant human interaction in order to create a three-dimensional representation that conforms with tolerance levels required for a CAD model.

In other prior art methods, systems require a structuring approach (i.e., Bottom-up modeling) that increases levels of abstraction from lower levels. For example, the methods described by Chen in U.S. Pat. No. 7,133,551, uses increased levels of abstraction from lower levels to form an object. The bottom-up modeling starts with segments that form polygons, polygons then form primitives, and the primitives are merged. With such methodology, however, enough segments must exist or be identified in order to perform an accurate structure process.

BRIEF DESCRIPTION OF SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
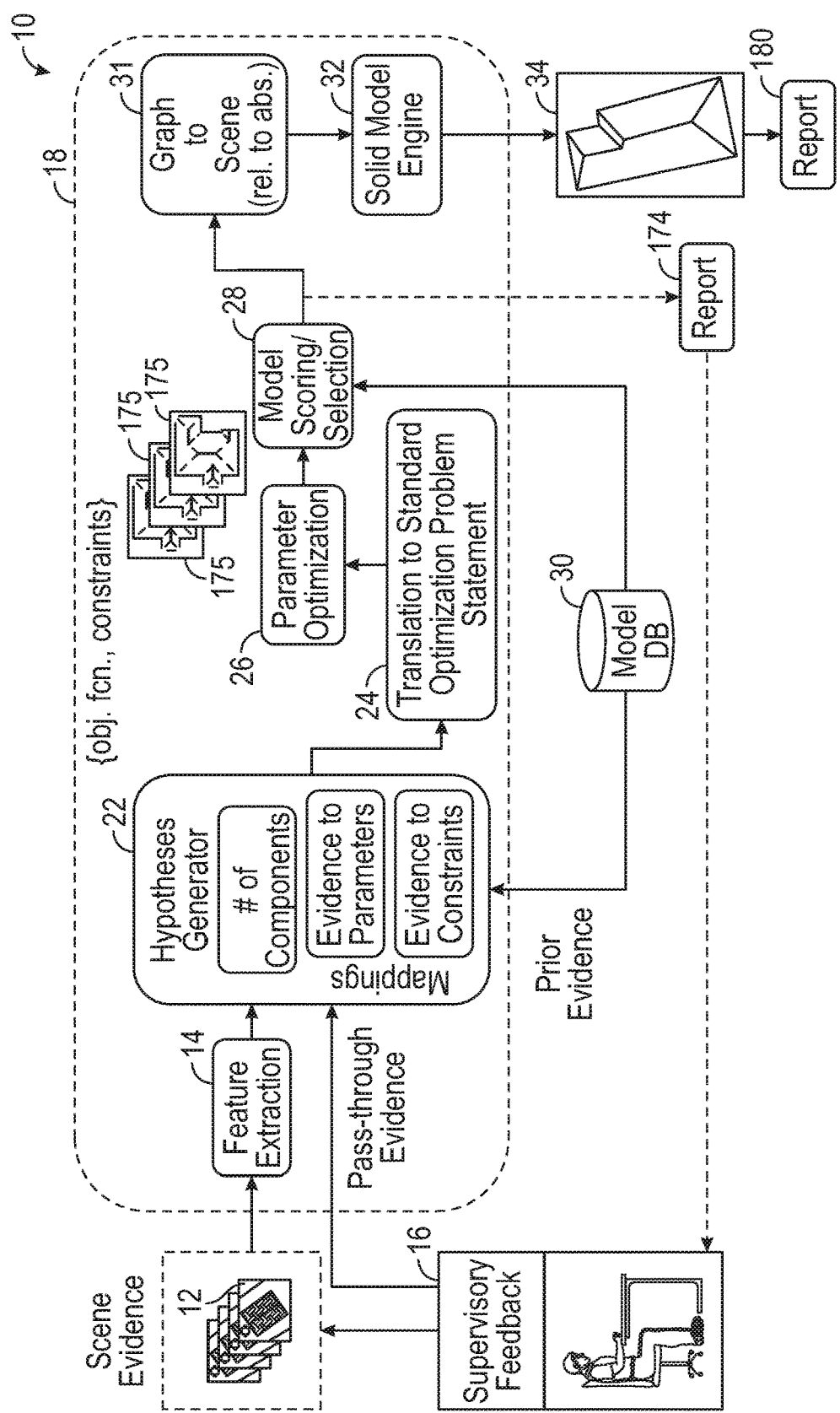
FIG. 1 illustrates a block diagram for automatic feature extraction of one or more natural and/or man-made structures within an image to form a three dimensional model, in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For example, although the roofing industry may be used as an example, feature extraction in one or more images in any industry is contemplated, such as Solar, Real Estate, Tax Assessment, Insurance Claims & Underwriting, Building Re/Construction and BIM (Building Information Management), Architecture & City Planning, Emergency Services, Entertainment (e.g., movies and videogaming), and the like. Additionally, the entire external structure including siding, walls, windows, doors, painting, landscaping, and/or the roof can be modeled using the techniques discussed herein. Further, interior structures such as floor plans, furniture, exposed plumbing and the like can also be modeled. In some embodiments, identification of features absent within one or more images is also contemplated. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital, or one or more suitably programmed processors (e.g., microprocessors) and associated hardware and software, or hard-wired logic. Also, "circuitry" may perform one or more functions. The term "circuitry," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by circuitry cause the circuitry to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

It is to be further understood that, as used herein, the term user or supervisor is not limited to a human being, and may comprise, a computer, a server, a website, a processor, a network interface, a human, a user terminal, a virtual computer, combinations thereof, and the like, for example.

The term, "data points", as used herein, refers to an identifiable element in a data set, such as points in a point cloud, vertices of roof facets, image pixels (e.g., RGB pixels), pixels of a point-cloud-based elevation map, or other features. It should be understood that the term "data points" is not limited to points corresponding to ridge endpoints.

Referring now to the Figures, and in particular to FIG. 1, shown therein is a flow chart 10 of an exemplary method for supervised automatic object modeling of one or more natural or man-made objects within sensor data depicting features of the natural or man-made objects. The sensor data may be indicative of a reflection of electromagnetic radiation in one or more bands including the visible band, the ultraviolet band, the infrared band, a combination(s) of the one or more bands, or the like. The sensor data may be an image or a series of images captured from emissions or reflections of natural light. In other embodiments, the electromagnetic radiation may be generated, provided to the natural or man-made object through the use of an electromagnetic radiation source. Reflections can be collected by a suitable receiver (including, but not limited to, antenna(s), and/or photodiode(s)) converted into data by appropriate circuitry, and processed by a computer system for detecting or locating objects. Exemplary systems that can be used to generate the sensor data are camera(s), radar(s), sonar(s), and/or lidar(s). The supervised automatic object modeling will be described herein, by way of example, for the purpose of creating a three dimensional model of a roof by analyzing images (pixel arrays) of reflected visible electromagnetic radiation.

Generally, the automatic object modeling includes component-based optimization using constrained optimization techniques to assemble the three dimensional models while reducing and/or eliminating post-assembly manual correction. In some embodiments, this system is based on a framework in which a wire-frame of the (roof) structures is not initially created by a user using a computer system to view and select points within a displayed image. Rather, the computer system uses feature detection techniques to obtain evidence of features of the object within the image(s) along with soft and hard constraints showing relative locations or orientations of the features relative to one another, and then the component-based optimization using constrained optimization techniques to assemble the three dimensional models. The constrained optimization techniques optimize an objective function with respect to variables in the presence of constraints on those variables. Constraints can be either hard constraints which set conditions for the variables that are required to be satisfied, or soft constraints which have some variable values that are penalized in the objective function if, and based on the extent that, the conditions on the variables are not satisfied. Soft constraints is evidence (e.g., quantitative, or dimensional) applied to model parameters, typically with a single component, that contributes to an objective function in the optimization. Hard constraints is evidence applied to model parameters, typically involving multiple components that contribute to a constraint function of the optimization, restricting the optimization result to admissible values. Hard constraints can be qualitative evidence such as a relative location of two components. Using this information, the automatic object modeling may adjust the parameters to determine a size and shape of components, select a number of solid model components preferably from a library of components, size the selected components, modify the shape of the selected components, and arrange the solid model components using suitable operations (such as boolean operations) to compose (roof) structures.

Further, the components may be chosen to require a relatively small number of relatively uncoupled parameters. A parameter that is uncoupled to any other parameter(s) may be modified independently without violating any of the required properties of the model. Where parameters are coupled, those constraints are specified explicitly. A component, as used herein, may consist of any solid shape. For example, the roof may be a symmetric gable roof. One way to model the symmetric gable roof is to use (x,y,z) coordinates at each vertex and a list of vertex pairs (edges), i.e., a wireframe model. However, because the symmetric gable roof has several required properties (including planar surfaces, symmetry in 2 dimensions, and horizontal eaves and ridge), modifying a location of a vertex (e.g., x,y,z) of one corner requires modifying 1 to 3 other corners' coordinates, to preserve the required properties. Vertex coordinates cannot, in general, be modified independently and still produce an admissible model. So, for the sake of describing a valid model, those parameters (vertex coordinates) are coupled because each vertex cannot be modified independently and still maintain a valid model.

Another way to parameterize the same symmetric gable roof is using length, width, and height (and azimuth and an absolute location of the symmetric gable roof's centroid). These parameters are uncoupled with respect to the required properties of the model. For example, changing the height does not require any changes to length, width, location, or azimuth, in order to produce a valid model.

An advantage of using uncoupled parameters to create the three dimensional model is that uncoupled parameters can be estimated independently, potentially by different algorithms, or from different photos/inputs, not limited to inputs from exclusively a single machine or exclusively a single technician. Rather, multiple machines and/or technicians can work simultaneously. Another advantage to uncoupled parameters is a reduction in a parameter count (e.g., from 18 to 7), so there is less to specify or estimate. (excluding the height and soffit depths of the optional wall base in the symmetric gable roof example, there are only 7 parameters ((i.e., length (of ridge & eaves), width (horizontal rafter length, which is symmetric and refers to a horizontal projection of 'footprint' of the rafter on the horizontal xy plane where "rafter length" is the minimum distance between a ridge and eave, i.e., the length of a segment that is perpendicular to both), Height (vertical distance from eaves to ridge), azimuth (i.e., of ridge), 3 dimensional position (i.e., xy centroid of the rectangular footprint, at the z-elevation of the eaves)), so only 7 degrees of freedom, yet the wireframe representation exists in an 18-dimensional space, so very little of the 18-dimensional space contains valid models— only a 7 dimensional subspace, which can be easier to search for a best fit than an 18-dimensional space). For example, if each parameter is considered as having a value along its own axis of some abstract "space", the 18 parameters for a simple gable roof come from (x,y,z) triplets for each of 6 vertices (i.e., 2 ridge endpoints, and 2 eave endpoints for each of 2 eaves), i.e., 3*(2+2×2)=18.

With respect to roof modeling, it has been found that many roofs can be modeled as a combination of a rectangular component with ridges indicative of a gable or a hip. In some embodiments, the automatic object modeling, as discussed herein, uses automated feature detection algorithms to identify the rectangular, hip and gable parts of a roof depicted in one or more images (instead of a user selecting points in an image to form a wireframe), and then uses constraints to combine rectangular component(s) with ridges indicative of a hip or a gable into a three dimensional model of the roof. Such modeling emphasizes a top down approach in that the methodology does not require a user to visually identify and select features of the roof, such as by creating a wire-frame of the roof, as a part of the methodology, or provide incremental levels of extraction from the image(s) to form the model. Instead, the methodology may accomplish formation constraints in a single step subsequent to determining a number and type of components with automated feature extraction techniques to explicitly apply observed/extracted features as evidence toward model parameters via soft and hard constraints as discussed above.

As shown in FIG. 1, generally one or more images 12 are provided in which at least one image 12 depicts an object of interest (e.g., a roof of a house). In a step 14, evidence including, but not limited to, statements about the roof may be determined using feature extraction techniques. Evidence is anything that may ultimately be used by the hypothesis generator to prescribe an optimization problem to solve for (roof/walls/structure) model parameters. For example, evidence may include, for example, what is depicted about the roof, and relative location of the depicted features of the roof. For example, evidence may include a determination that multiple pixels within the image 12 shows an edge, a determination on whether the edge depicted in the image 12 is of a particular type (ridge, eave, rake, etc.), a determination on whether the edge passes through one or more particular location, a determination of location of end points of the edge. Additionally evidence may also include constraints related to features in the images 12. Constraints may include geometric relationships between features (e.g., parallel, perpendicular, and collinear). In some embodiments, supervisory feedback 16 from an individual supervising the automatic object modeling may be provided based upon a review of the images 12, or on automatically generated evidence including types of edges, and/or constraints. For example, supervisory feedback 16 may include data on constraints such as indicating whether two segments are coplanar. In another example, supervisory feedback may include data on whether a roof includes a cascaded hip arrangement.

The method includes an automated process 18 for providing one or more hypothesis models of the object of interest. Formation of the hypothesis model and component-based optimization performed on the hypothesis models may reduce and/or eliminate post-assembly manual correction as described in further detail herein. While supervisory feedback 16 may be included during particular intervals of the automated process 18, such feedback may be observational and generally may not include edits of internal states of the process except as noted herein.

Referring to FIG. 1, the automated process 18 may include the step 14 of feature extraction wherein edges of the object of interest and relationship(s) between such edges may be determined. Further, the automated process 18 may also include a hypotheses generator 22 that utilizes the information obtained from the steps 14, and 16 to generate one or more hypotheses models. The hypotheses model is a proposed explanation of the structure of the object of interest. When the object of interest is a roof, the hypotheses model may include determination of a number of components for the roof, evidence parameters and constraints as discussed in detail herein. Generally, the object of interest may be composed of multiple components, with each component being a characteristic formation as described in further detail herein. Statements included in each hypothesis describe the relationship between the components and associated evidence parameters and constraints.

The hypothesis model is provided to a translator 24, which serves to translate each hypothesis model into a standard optimization problem statement. The standard optimization problem statement may be provided to an optimizer engine 26 that analyzes the standard problem statement and attempts to minimize the objective function (soft constraints on the model parameters) subject to the constraints (hard constraints on the model parameters) to improve the description of the object of interest. The optimizer engine 26 may perform one or more iterations on the standard optimization problem statement before creating and providing an optimized model. Additionally, parameter optimization may be performed on the optimized model as indicated in step 26. In some embodiments, each hypothesis model and resulting optimized model may be scored and ranked as shown in step 28, with the highest-ranking model (or multiple models) presented for supervisory feedback 16. In some embodiments, one or more database 30 may be used to supply prior evidence, provide probabilities guiding hypotheses generation, aid in scoring, and/or the like to the hypotheses generator 22.

Output of the model scoring process may include optimized component-based model modeling of components with coordinates as indicated in a step 31. Each optimized component-based model may include one or more collections of components and/or negative components and associated parameters. In some embodiments, components may include absolute locations (e.g., anchor (x, y, z) and azimuth) and relative parameters (e.g., length, width, height). In a step 32, one or more solid model Boolean operations may be performed to provide one or more three dimensional models 34 of the object of interest from the optimized component-based model.

Examples of the hardware/software for obtaining the images and performing the steps described above will now be described.

Figure 2:
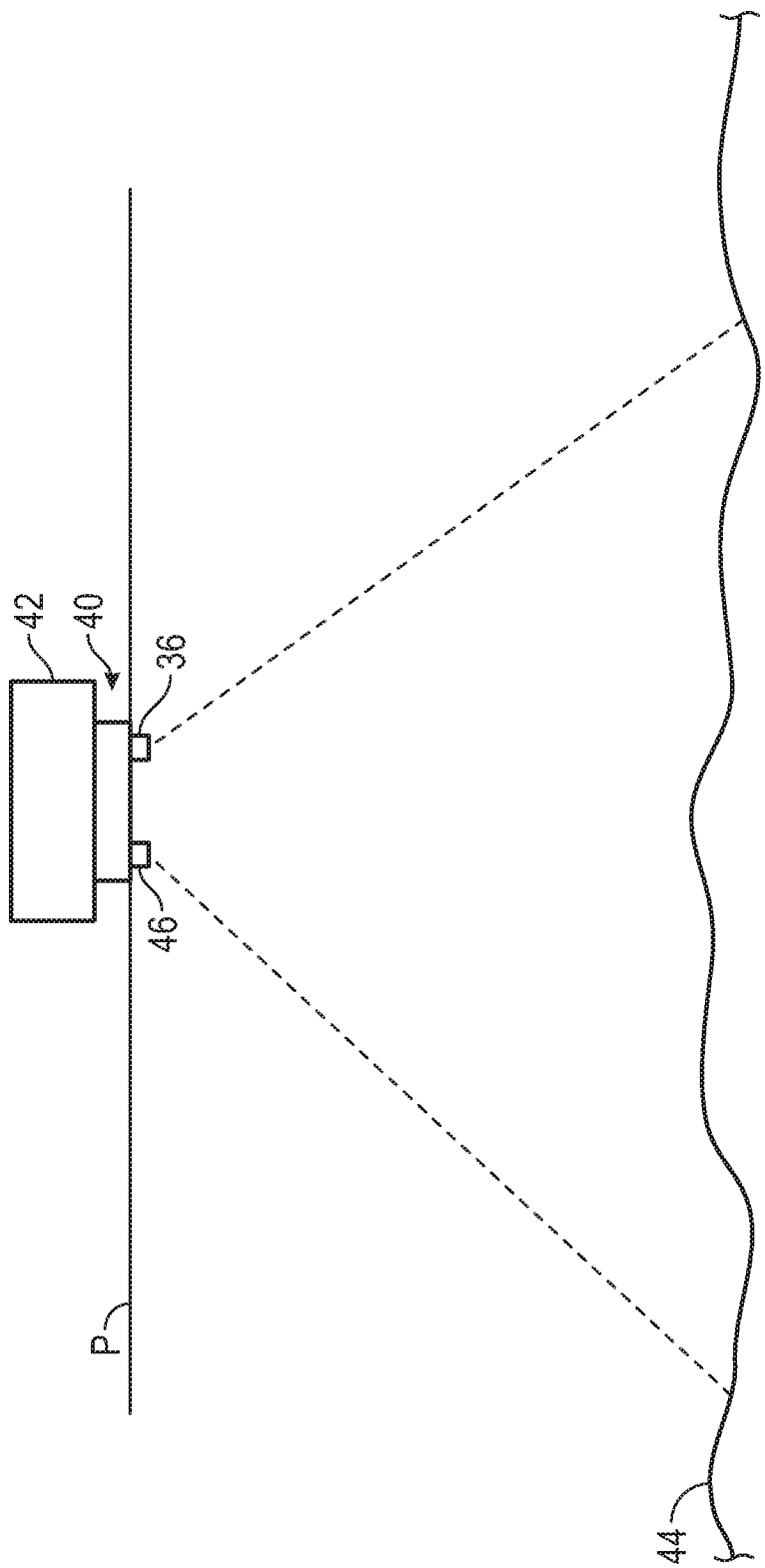
FIG. 2 illustrates a schematic diagram of hardware forming an exemplary embodiment of a system for automatic feature extraction of one or more natural and/or man-made structures within an image to form a three dimensional model. The system includes an image capturing system and a computer system.

Referring to FIGS. 1 and 2, in some embodiments, an image capturing system 40 may be used to obtain the one or more images 12. The image capturing system 40 may include a platform 42 carrying the image capturing system 40. The platform 42 may be an airplane, unmanned aerial system, space shuttle, rocket, satellite, and/or any other suitable vehicle capable of carrying the image capturing system 40. For example, in some embodiments, the platform 42 may be a fixed wing aircraft.

The platform 42 may carry the image capturing system 40 at one or more altitudes above a ground surface 44. For example, the platform 42 may carry the image capturing system 40 over a predefined area and at one or more predefined altitudes above the Earth's surface and/or any other surface of interest. In FIG. 2, the platform 42 is illustrated carrying the image capturing system 40 at a plane P above the ground surface 44.

The platform 42 may be capable of controlled movement and/or flight. As such, the platform 42 may be manned or unmanned. In some embodiments, the platform 42 may be capable of controlled movement and/or flight along a predefined flight path and/or course. For example, the platform 42 may be capable of controlled movement and/or flight along the Earth's atmosphere and/or outer space.

The platform 42 may include one or more systems for generating and/or regulating power. For example, the platform 42 may include one or more generators, fuel cells, solar panels, and/or batteries for powering the image capturing system 40.

Figure 3:
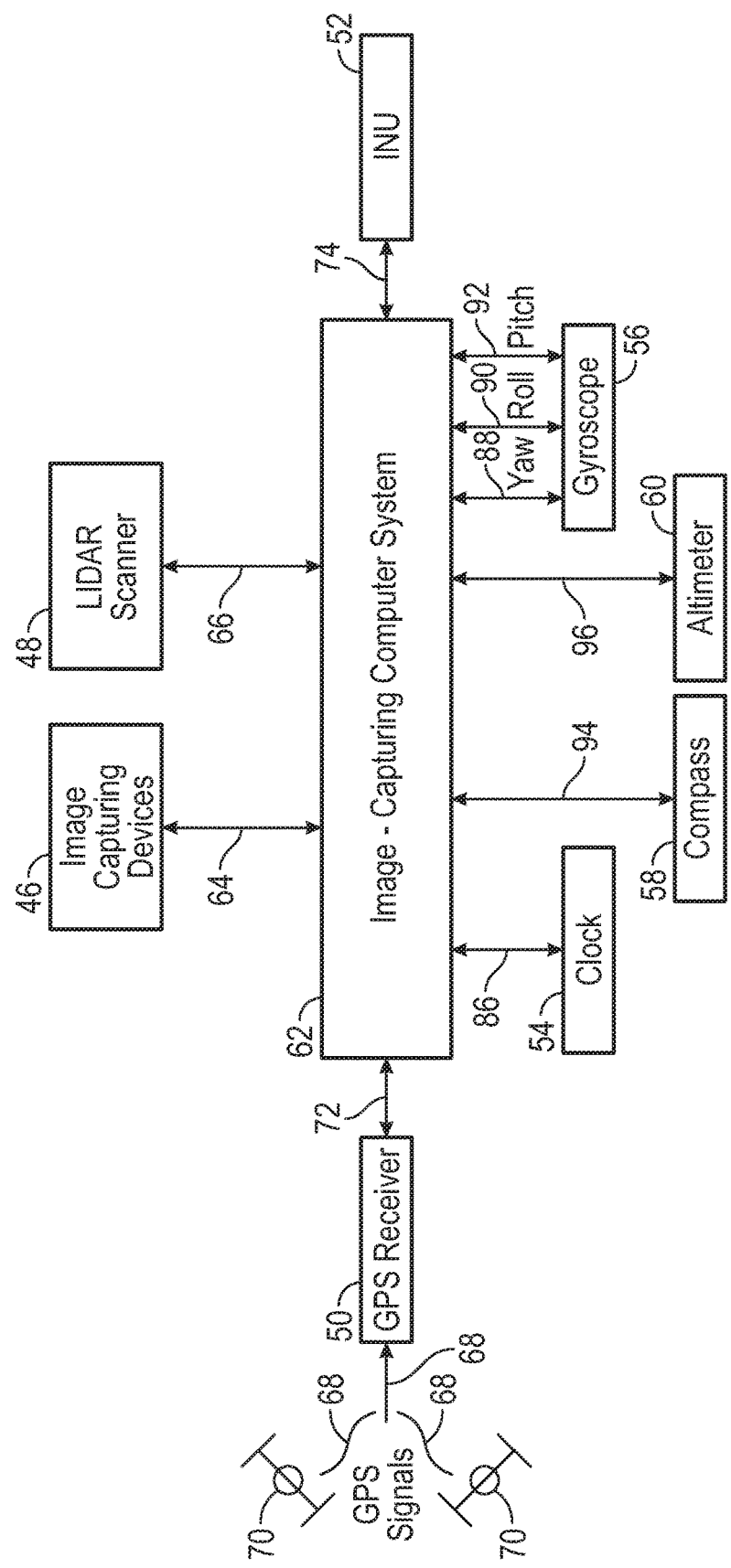
FIG. 3 illustrates a diagrammatic view of an example of the image-capturing system of FIG. 2.

Referring to FIGS. 2 and 3, the image capturing system 40 may include one or more image capturing devices 46 configured to obtain an image from which a point cloud may be generated. In some embodiments, the image capturing system 40 may optionally include one or more LIDAR scanners 48 to generate data that can be used to create a point cloud. Additionally, in some embodiments, the image capturing system 40 may include one or more global positioning system (GPS) receivers 50, one or more inertial navigation units (INU) 52, one or more clocks 54, one or more gyroscopes 56, one or more compasses 58, and one or more altimeters 60. One or more of these elements of the image capturing system 40 may be interconnected with an image capturing and processing computer system 62. In some embodiments, the internal and external orientation information for the images can be determined during post processing using an image processing technique, such as bundle adjustment. In these embodiments, the image capturing system 40 may not include the one or more INU 52.

In some embodiments, the one or more image capturing devices 46 may be capable of capturing images photographically and/or electronically. The one or more image capturing devices 46 may be capable and/or configured to provide oblique and/or vertical images, and may include, but are not limited to, conventional cameras, digital cameras, digital sensors, charge-coupled devices, thermographic cameras and/or the like. In some embodiments, the one or more image capturing devices 46 may be one or more ultra-high resolution cameras. For example, in some embodiments, the one or more image capturing devices 46 may be ultra-high resolution capture systems, such as may be found in the Pictometry PentaView Capture System, manufactured and used by Pictometry International based in Henrietta, N.Y.

The one or more image capturing devices 46 may include known or determinable characteristics including, but not limited to, focal length, sensor size, aspect ratio, radial and other distortion terms, principal point offset, pixel pitch, alignment, and/or the like.

The one or more image capturing devices 46 may acquire one or more images and issue one or more image data signals 64 corresponding to one or more particular images taken. Such images may be stored in the image capturing and processing computer system 62.

The LIDAR scanner 48 may determine a distance between the platform 42 and objects on or about the ground surface 44 by illuminating a laser and analyzing the reflected light to provide data points. In some embodiments, software associated with the LIDAR scanner 48 may generate a depth map or point cloud based on the measured distance between the platform 42 on and/or about the object of interest. To that end, the LIDAR scanner 48 may issue one or more data signals 66 to the image capturing and processing computer system 62 of such data points providing a point cloud wherein each data point may represent a particular coordinate. An exemplary LIDAR scanner 48 may be the Riegl LMS-Q680i, manufactured and distributed by Riegl Laser Measurement Systems located in Horn, Austria. It should be noted that distance between the platform 42 and objects on or about the ground surface 44 may be determined via other methods including, but not limited to, stereographic methods.

In some embodiments, the LIDAR scanner 48 may be a downward projecting high pulse rate LIDAR scanning system. It should be noted that other three-dimensional optical distancing systems or intensity-based scanning techniques may be used. In some embodiments, the LIDAR scanner 48 may be optional as a point cloud may be generated using one or more images and photogrammetric image processing techniques, e.g., the images may be geo-referenced using position and orientation of the image capturing devices 46 and matched together to form the point cloud.

The GPS receiver 50 may receive global positioning system (GPS) signals 68 that may be transmitted by one or more global positioning system satellites 70. The GPS signals 68 may enable the location of the platform 42 relative to the ground surface 44 and/or an object of interest to be determined. The GPS receiver 50 may decode the GPS signals 68 and/or issue location signals 72. The location signals 72 may be dependent, at least in part, on the GPS signals 68 and may be indicative of the location of the platform 42 relative to the ground surface 44 and/or an object of interest. The location signals 72 corresponding to each image 12 captured by the image capturing devices 46 may be received and/or stored by the image capturing and processing computer system 62 in a manner in which the location signals are associated with the corresponding image.

The INU 52 may be a conventional inertial navigation unit. The INU 52 may be coupled to and detect changes in the velocity (e.g., translational velocity, rotational velocity) of the one or more image capturing devices 46, the LIDAR scanner 48, and/or the platform 42. The INU 52 may issue velocity signals and/or data signals 74 indicative of such velocities and/or changes therein to the image capturing and processing computer system 62. The image capturing and processing computer system 62 may then store the velocity signals and/or data 74 corresponding to each image captured by the one or more image capturing devices 46 and/or data points collected by the LIDAR scanner 48.

The clock 54 may keep a precise time measurement. For example, the clock 54 may keep a precise time measurement used to synchronize events. The clock 54 may include a time data/clock signal 86. In some embodiments, the time data/clock signal 86 may include a precise time that one or more images 12 are taken by the one or more image capturing devices 46 and/or the precise time that points are collected by the LIDAR scanner 48. The time data/clock signal 86 may be received by and/or stored by the image capturing and processing computer system 62. In some embodiments, the clock 54 may be integral with the image capturing and processing computer system 62, such as, for example, a clock software program.

The gyroscope 56 may be conventional gyroscope commonly found on airplanes and/or within navigation systems (e.g., commercial navigation systems for airplanes). The gyroscope 56 may submit signals including a yaw signal 88, a roll signal 90, and/or a pitch signal 92. In some embodiments, the yaw signal 88, the roll signal 90, and/or the pitch signal 92 may be indicative of the yaw, roll and picture of the platform 42. The yaw signal 88, the roll signal 90, and/or the pitch signal 92 may be received and/or stored by the image capturing and processing computer system 62.

The compass 58 may be any conventional compass (e.g., conventional electronic compass) capable of indicating the heading of the platform 42. The compass 58 may issue a heading signal and/or data 94. The heading signal and/or data 94 may be indicative of the heading of the platform 42. The image capturing and processing computer system 62 may receive, store and/or provide the heading signal and/or data 94 corresponding to each image captured by the one or more image capturing devices 46.

The altimeter 60 may indicate the altitude of the platform 42. The altimeter 60 may issue an altimeter signal and/or data 96. The image capturing and processing computer system 62 may receive, store and/or provide the altimeter signal and/or data 96 corresponding to each image captured by the one or more image capturing devices 46.

Figure 4:
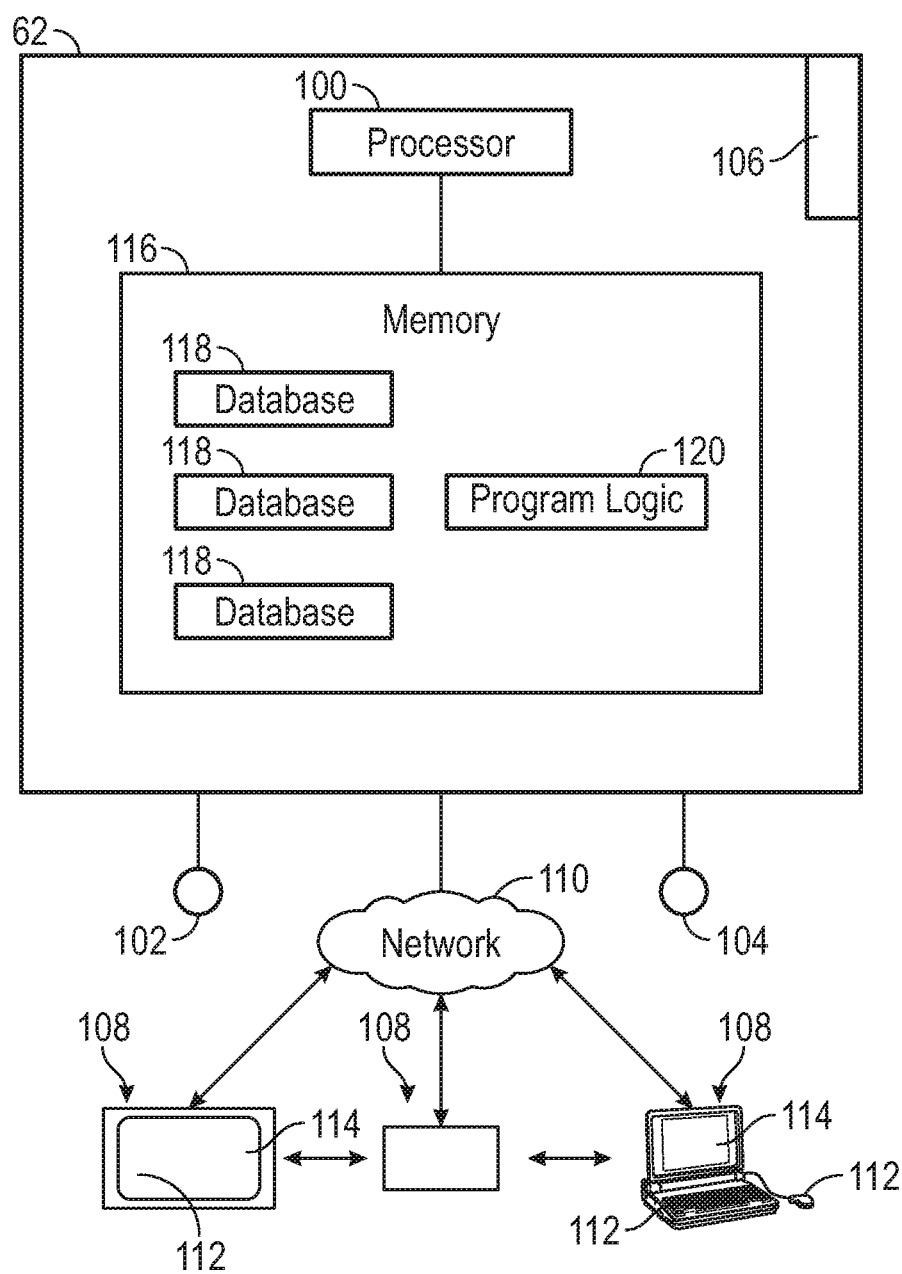
FIG. 4 illustrates a block diagram of the image-capturing computer system of FIG. 3 communicating via a network with multiple processors.

Referring to FIGS. 3 and 4, the image capturing and processing computer system 62 may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors. For example, a subsystem of the image capturing and processing computer system 62 can be located on the platform 42, and another subsystem of the image capturing and processing computer system 62 can be located in a data center having multiple computers and/or processors networked together.

In some embodiments, the image capturing and processing computer system 62 may include one or more processors 100 communicating with one or more image capturing input devices 102, image capturing output devices 104, and/or I/O ports 106 enabling the input and/or output of data to and from the image capturing and processing computer system 62.

FIG. 4 illustrates the image capturing and processing computer system 62 having a single processor 100. It should be noted, however, that the image capturing and processing computer system 62 may include multiple processors 100. In some embodiments, the processor 100 may be partially or completely network-based or cloud-based. The processor 100 may or may not be located in a single physical location. Additionally, multiple processors 100 may or may not necessarily be located in a single physical location.

The one or more image capturing input devices 102 may be capable of receiving information input from a user and/or processor(s), and transmitting such information to the processor 100. The one or more image capturing input devices 102 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more image capturing output devices 104 may be capable of outputting information in a form perceivable by a user and/or processor(s). For example, the one or more image capturing output devices 80 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more image capturing input devices 102 and the one or more image capturing output devices 104 may be implemented as a single device, such as, for example, a touchscreen or a tablet.

Each of the data signals 64, 66, 72, 74, 86, 88, 90, 92, 94, and/or 96 or data provided by such signals may be provided to the image capturing and processing computer system 62. For example, each of the data signals 64, 66, 72, 74, 86, 88, 90, 92, 94, and/or 96 may be received by the image capturing and processing computer system 62 via the I/O port 106. The I/O port 106 may comprise one or more physical and/or virtual ports.

In some embodiments, the image capturing and processing computer system 62 may be in communication with one or more additional processors 108 as illustrated in FIG. 4. Processors 108, for example, may be used in providing supervisory feedback 16 as shown in FIG. 1.

In some embodiments, the image capturing and processing computer system 62 may communicate with the one or more additional processors 108 via a network 110. As used herein, the terms "network-based", "cloud-based", and any variations thereof, may include the provision of configurable computational resources on demand via interfacing with a computer and/or computer network, with software and/or data at least partially located on the computer and/or computer network, by pooling processing power of two or more networked processors.

In some embodiments, the network 110 may be the Internet and/or other network. For example, if the network 110 is the Internet, a primary user interface of the image capturing software and/or image manipulation software may be delivered through a series of web pages. It should be noted that the primary user interface of the image capturing software and/or image manipulation software may be replaced by another type of interface, such as, for example, a Windows-based application.

The network 110 may be almost any type of network. For example, the network 110 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 110 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. Additionally, the network 110 may use a variety of network protocols to permit bi-directional interface and/or communication of data and/or information. It is conceivable that in the near future, embodiments of the present disclosure may use more advanced networking topologies.

The image capturing and processing computer system 62 may be capable of interfacing and/or communicating with the one or more computer systems including processors 108 via the network 110. Additionally, the one or more processors 108 may be capable of communicating with each other via the network 110.

The processors 108 may include, but are not limited to implementation as a variety of different types of computer systems, such as a server system having multiple servers in a configuration suitable to provide a commercial computer based business system (such as a commercial web-site and/or data center), a personal computer, a smart phone, a network-capable television set, a television set-top box, a tablet, an e-book reader, a laptop computer, a desktop computer, a network-capable handheld device, a video game console, a server, a digital video recorder, a DVD player, a Blu-Ray player, a wearable computer, a ubiquitous computer, combinations thereof, and/or the like.

In some embodiments, the computer systems comprising the processors 108 may include one or more input devices 112, one or more output devices 114, processor executable code, and/or a web browser capable of accessing a website and/or communicating information and/or data over a network, such as network 110. The computer systems comprising the one or more processors 108 may include one or more non-transient memory comprising processor executable code and/or software applications, for example. The image capturing and processing computer system 62 may be modified to communicate with any of these processors 108 and/or future developed devices capable of communicating with the image capturing and processing computer system 62 via the network 110.

The one or more input devices 112 may be capable of receiving information input from a user, processors, and/or environment, and transmit such information to the processor 108 and/or the network 110. The one or more input devices 112 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 114 may be capable of outputting information in a form perceivable by a user and/or processor(s). For example, the one or more output devices 114 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 112 and the one or more output devices 114 may be implemented as a single device, such as, for example, a touchscreen or a tablet.

Referring to FIG. 4, in some embodiments, the image capturing and processing computer system 62 may include one or more processors 100 working together, or independently to execute processor executable code, and one or more memories 116 capable of storing processor executable code. In some embodiments, each element of the image capturing and processing computer system 62 may be partially or completely network-based or cloud-based, and may or may not be located in a single physical location.

The one or more processors 100 may be implemented as a single or plurality of processors working together, or independently, to execute the logic as described herein. Exemplary embodiments of the one or more processors 100 may include, but are not limited to, a digital signal processor (DSP), a central processing unit (CPU), a field programmable gate array (FPGA), a microprocessor, a multi-core processor, and/or combination thereof, for example. The one or more processors 100 may be capable of communicating via the network 110, illustrated in FIG. 4, by exchanging signals (e.g., analog, digital, optical, and/or the like) via one or more ports (e.g., physical or virtual ports) using a network protocol. It is to be understood, that in certain embodiments, using more than one processor 100, the processors 100 may be located remotely from one another, in the same location, or comprising a unitary multi-core processor. The one or more processors 100 may be capable of reading and/or executing processor executable code and/or capable of creating, manipulating, retrieving, altering, and/or storing data structures into one or more memories 116.

The one or more memories 116 may be capable of storing processor executable code. Additionally, the one or more memories 116 may be implemented as a conventional non-transitory memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 116 may be located in the same physical location as the image capturing and processing computer system 62. Alternatively, one or more memories 116 may be located in a different physical location as the image capturing and processing computer system 62, with the image capturing and processing computer system 62 communicating with one or more memories 116 via a network such as the network 110, for example. Additionally, one or more of the memories 116 may be implemented as a "cloud memory" (i.e., one or more memories 116 may be partially or completely based on or accessed using a network, such as network 110, for example).

Referring to FIG. 4, the one or more memories 116 may store processor executable code and/or information comprising one or more databases 118 and program logic 120 (i.e., computer executable logic). In some embodiments, the processor executable code may be stored as a data structure, such as a database and/or data table, for example. For example, one of the databases 118 can be a geospatial database storing aerial images, another one of the database 118 can store point clouds, and another one of the database 118 can store the internal and external orientation information for geo-referencing the images within the geospatial database. In some embodiments, one or more of the database 118 may store prior hypotheses and/or models obtained via the process illustrated in FIG. 1.

In use, the image capturing and processing computer system 62 may execute the program logic 120 which may control the reading, manipulation, and/or storing of data signals 64, 66, 72, 74, 86, 88, 90, 92, 94, and/or 96. For example, the program logic may read data signals 64 and 66, and may store them within the one or more memories 116. Each of the signals 72, 74, 86, 88, 90, 92, 94, and/or 96, may represent the conditions existing at the instance that an oblique image and/or nadir image is acquired and/or captured by the one or more image capturing devices 46.

In some embodiments, the image capturing and processing computer system 62 may issue an image capturing signal to the one or more image capturing devices 46 to thereby cause those devices to acquire and/or capture an oblique image and/or a nadir image at a predetermined location and/or at a predetermined interval. In some embodiments, the image capturing and processing computer system 62 may issue the image capturing signal dependent on at least in part on the velocity of the platform 42. Additionally, the image capturing and processing computer system 62 may issue a point collection signal to the LIDAR scanner 48 to thereby cause the LIDAR scanner 48 to collect points at a predetermined location and/or at a predetermined interval.

Program logic 120 of the image capturing and processing computer system 62 may decode, as necessary, and/or store the aforementioned signals within the memory 116, and/or associate the data signals with the image data signals 64 corresponding thereto, or the LIDAR scanner signal 66 corresponding thereto. Thus, for example, the altitude, orientation, roll, pitch, yaw, and the location of each image capturing device 46 relative to the ground surface 44 and/or object of interest for images 12 captured may be known. More particularly, the [X, Y, Z] location (e.g., latitude, longitude, and altitude) of an object or location seen within the images or location seen in each image may be determined. Similarly, the altitude, orientation, roll, pitch, yaw, and the location of the LIDAR scanner 48 relative to the ground surface 44 and/or object of interest for collection of data points may be known. More particularly, the [X, Y, Z] location (e.g., latitude, longitude, and altitude) of a targeted object or location may be determined. In some embodiments, location data for the targeted object or location may be catalogued within one or more database for retrieval.

The platform 42 may be piloted and/or guided through an image capturing path that may pass over a particular area of the ground surface 44. The number of times the platform 42 and/or the one or more image capturing devices 46 and LIDAR scanner 48 pass over the area of interest may be dependent at least in part upon the size of the area and the amount of detail desired in the captured images.

As the platform 42 passes over an area of interest, a number of images 12 (e.g., oblique images, nadir images) may be captured by the one or more image capturing devices 46 and data points may be captured by the LIDAR scanner 48 (optional). In some embodiments, the images 12 may be captured and/or acquired by the one or more image capturing devices 46 at predetermined image capture intervals that may be dependent, at least in part, upon the velocity of the platform 42. For example, the safe flying height for a fixed wing aircraft may be a minimum clearance of 2,000' above the ground surface 44, and may have a general forward flying speed of 120 knots. In this example, oblique image-capturing devices may capture 1 cm to 2 cm ground sample distance imagery, and vertical image-capturing devices may be capable of capturing 2 cm to 4 cm ground sample distance imagery.

The image data signals 66 corresponding to each image acquired and the data point via the LIDAR scanner 48 may be received by and/or stored within the one or more memories 116 of the image capturing and processing computer system 62 via the I/O port 106. Similarly, the signals 72, 74, 86, 88, 90, 92, 94, and/or 96 corresponding to each captured image 12 may be received and stored within the one or more memories 116 of the image capturing and processing computer system 62 via the I/O port 106. The LIDAR scanner signals 66 may be received and stored as LIDAR 3D point clouds.

Thus, the location of the one or more image capturing devices 46 at the precise moment each image is captured is recorded within the one or more memories 116 and associated with the corresponding captured oblique and/or nadir image. Additionally, location data associated with one or more object of interest may be catalogued and stored within one or more database.

In some embodiments, point cloud data related to the feature of interest may be generated using one or more images. Alternatively, point cloud data related to a missing feature (e.g., clearing in a forest), may be generated using one or more images. In some embodiments, an estimated three-dimensional shape may be determined using one or more images. Further, in some embodiments, features within images and/or missing features within images may be catalogued (e.g., spatial cataloguing) within one or more databases for retrieval and/or analysis. For example, measurements of features (e.g., shape or size of component(s), shape or size of ridge, eave, rake, or the like, size of building(s), height of tree(s), footprint(s) of man-made or non-man made feature(s)) may be obtained. In some embodiments, such features may be stored in one or more database with measurements of features associated therewith, in addition to other metadata associated with the feature and/or image (e.g., date, algorithms used).

The processor 100 may create and/or store in the one or more memories 116, one or more output image and data files. For example, the processor 100 may convert data signals 64, 66, 72, 74, 86, 88, 90, 92, 94, and/or 96 into computer-readable output image, data files, and LIDAR 3D point cloud files. The output image, data files, and LIDAR 3D point cloud files may include a plurality of captured image files corresponding to captured oblique and/or nadir images, positional data, and/or LIDAR 3D point clouds corresponding thereto. Additionally, data associated with the one or more object of interest and/or images may be catalogued and saved within one or more database. For example, location information and/or metadata may be catalogued and saved within one or more database.

Output image, data files, and LIDAR 3D point cloud files may then be further provided, displayed and/or used for obtaining measurements of and between objects depicted within the captured images, including measurements of variable distribution. In some embodiments, the image capturing and processing computer system 62 may be used to provide, display and/or obtain measurements of and between objects depicted within the captured images and/or perform the automated process 18 shown in FIG. 1. Alternatively, the image capturing and processing computer system 62 may deliver the output image, data files, and/or LIDAR 3D point clouds to one or more processors, such as, for example, the processors 84 illustrated in FIG. 4 for processors 84 to provide, display and/or obtain measurement and/or perform the automated process 18 shown in FIG. 1.

In some embodiments, delivery of the output image, data files, and/or LIDAR 3D point cloud files may also be by physical removal of the files from the image capturing and processing computer system 62. For example, the output image, data files, and/or LIDAR 3D point cloud files may be stored on a removable storage device and transported to one or more processors 108. In some embodiments, the image capturing and processing computer system 62 may provide at least a portion of the display and/or determine at least a portion of the measurements further described herein.

For simplicity, the following description for modeling of objects of interest as described herein includes reference to residential housing wherein the roof is the object of interest; however, it should be understood by one skilled in the art that the methods described herein may be applied to any structure and/or object of interest. For example, the methods may be applied to any man made and/or natural object (e.g., commercial building structure, tree, driveway, road, bridge, concrete, water, turf and/or the like). Additionally, modeling may include modeling of negative components (e.g., a notch into an eave side of a roof, a facet cut that turns a gable into a Dutch hip, or the clearing in a forest).

FIGS. 5-9 illustrate exemplary images and diagrams that are annotated to explain how embodiments of the present disclosure automatically locate objects of interest and automatically generate three-dimensional models of the object(s) of interest that can be used for a variety of purposes including automated roofing reports, change detection by comparing roof outlines generated from imagery of the same roof but captured at different times, and the like.

Figure 5:
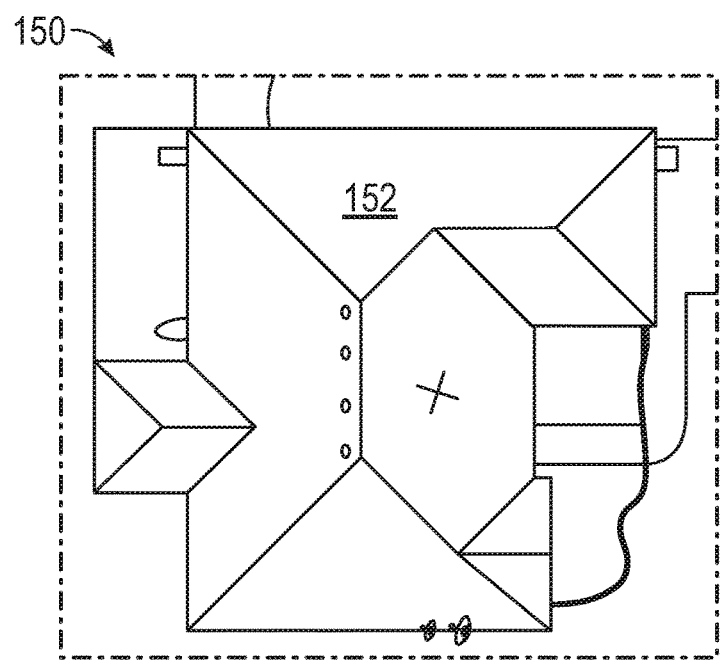
FIG. 5 illustrates a screen shot of an image of a region having an object of interest in accordance with the present disclosure.

Referring to FIG. 5, illustrated therein is a screen shot 150 of an image 12 having an object of interest 152. In this example, a roof is the object of interest 152. It should be noted that the object(s) of interest and/or feature(s) of the object(s) of interest may be any natural and/or man-made objects within the image. For simplicity of description, the roof will be described as the object of interest and used in the following description. It should be noted, however, that any object of interest within an image may be used including man-made or non-man made objects (e.g., natural objects). Further, objects of interest absent within an image may also be determined using systems and methods described herein.

Generally, the output image file and data files may be used to geo-reference the collected images. Exemplary methods for geo-referencing the imagery may be found in at least U.S. Pat. Nos. 7,424,133 and 5,247,356, which are hereby incorporated by reference in their entirety. Geo-referencing each image results in information that can be used with predetermined algorithms, such as a single-ray projection algorithm, to determine three dimensional geographical coordinates for points in each image. Using the internal and external orientation information also permits the real-world three-dimensional position of pixels to be determined using multiple images and stereophotogrammetry techniques. In some embodiments, a point cloud may be generated as discussed above using geo-referenced images and/or LIDAR data points. Dimensions of the objects of interest 152, including but not limited to length, width and area of the one or more sections of the object of interest 152 can also be determined using image calibration information in which a real-world size of each pixel within at least one of the images 12 depicting the object of interest 152 is known.

Techniques for determining the dimensions are disclosed in U.S. Pat. No. 8,078,436, the entire content of which is hereby incorporated herein by reference.

In some embodiments, point cloud data related to the object of interest may be generated using the one or more images 12. In some embodiments, an estimated three-dimensional shape may be determined using one or more images 12.

Additionally, image features (e.g., line segments, curves, textures, segmentation regions and the like) evidence, soft constraints and hard constraints regarding the object of interest 152 may be determined from the images 12 and associated data collected from the images 12. Evidence parameters include data related to the object of interest 152 including features associated with the object of interest 152 (e.g., edge types, symmetry, relative measurements) and locations of such features (e.g., edge associated near a ridge). For example, evidence parameters may include identification of features within the image 12 such as identification of an edge type (e.g., ridge, eave, rake, etc.) passing through a particular location. In another example, evidence parameters indicative of soft constraints of a component may include identification of one or more line segments having two endpoints within a facet. Evidence parameters indicative of other soft constraints may also include information related to a particular location, such as, for example, identification of one or more hip endpoints, gable endpoints, junction endpoints, and identification of one or more edges associated with a particular location, for example.

In another example, evidence parameters indicative of hard constraints may include relationships of features relative to one another, such as, for example, cascading of a feature (e.g., cascading from a hip, cascading from an interior of a hip end), crossing (i.e., having a perpendicular ridge) such as crossing from a hip and having a lateral facet coplanar with a parent hip end. In another example, evidence parameters of hard constraints may include data related to relative measurements of features including, but not limited to, height, length, width, elevation, symmetry and/or the like, as well as, constraints related to such evidence. In some embodiments, portions of the object of interest 152 may be evaluated for evidence parameters. In particular, a region may be identified and evidence related to such region may be evaluated. For example, a polygonal region within the object of interest 152 may be identified (e.g., a roof section) and evaluated to identify evidence such as whether the polygonal region belongs to a single roof section, contains an entire region of interest/object of interest 152, or contains nothing of interest. This evidence is a hard constraint that limits the search space by disallowing multiple sections, disallowing anything outside of the roof section, or disallowing anything inside the roof section.

Additionally, constraints related to the object of interest and features of the object of interest 152 may be identified. Constraints may include inequality constraints or equality constraints. For example, a first constraint may be that a ridge must be a set length. In another example, a second constraint may be that elevation levels of two edges must be the same or substantially the same.

Referring to FIGS. 1, 3, and 5, in some embodiments, evidence parameters and constraints may be automatically determined using the images 12 and data associated with the images 12. In some embodiments, supervisory feedback 16 may include additional evidence and/or constraints. For example, supervisory feedback 16 may include data related to elevation of one or more edges, one or more pieces of wire frame, arrangement of one or more features (e.g., coplanar, cascaded hip arrangement) and/or the like.

Once evidence parameters and constraints have been identified either automatically within the images 12 and/or provided via supervisory feedback 16, the image capturing and processing computer system 62 and/or processors 108 may provide an automated process for modeling the object of interest 152 in accordance with the present disclosure. Such process may include supervisor observation; however, such observation generally does not include editing the model parameters or the evidence detected by the automated process prior to scoring of each model. In some embodiments, high level inputs may be provided if needed. The supervisor observations provide indications of whether or not the automated methodologies successfully extracted the evidence/relationships of the components. It should be understood that there is a tendency for lower-abstraction inputs to be time-consuming for a human and available to be determined from automatic methods, while high-abstraction inputs are less available from automatic methods but require relatively little effort from a human since high-abstraction inputs can replace the need for a larger number of low-level inputs. So, the preferred method would allow the human to supply as high a level of input as appropriate whenever automatic extraction methods (at any level of abstraction) fail. That said, abnormal/uncommon objects are more likely to require supervisory inputs to clarify inputs due to the lack of any common objects being located in the database 30.

For example, lower abstraction inputs would include the following 3 qualitative hard constraints: A specific eave on component A is collinear with a specific eave on component B; The ridge in component A is coincident with a specific hip segment on component B; and Ridge A is parallel to Ridge B. These three hard constraints could be determined by the feature detection algorithms executed by the computer. Alternatively, a technician could supply a single higher level hard constraint as follows: Component A cascades from a specific hip edge on Component B (with a default common eave level).

Figure 6:
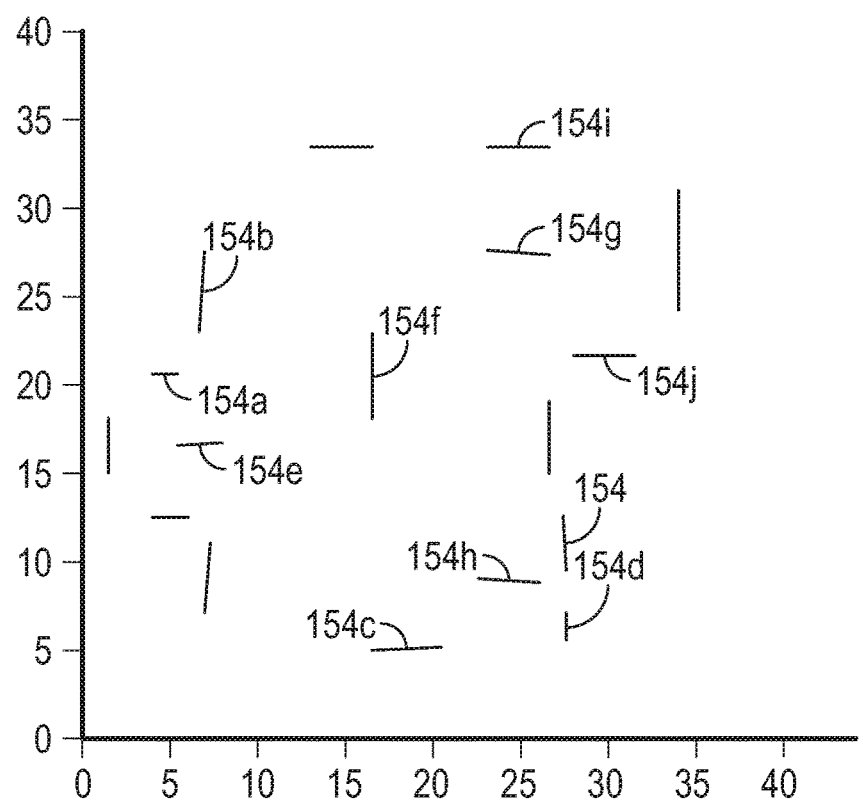
FIG. 6 illustrates a graphical view of feature extraction, and in particular, resulting edges of an object of interest obtained via feature extraction.

Referring to FIGS. 1 and 6, edges 154 may be identified from the images 12 using dynamic feature extraction in the step 14. Some of the edges 154 are labeled by way of example in FIG. 6 as edges 154*a-j*. Dynamic feature extraction may include methods and techniques including traditional computer vision techniques, photogrammetric techniques (e.g., images 12 have overlapping field of views (FOV)), deep learning techniques, third party data (e.g., parcel boundaries), metadata (e.g., customer annotations via website and/or mobile device), and/or the like. Using evidence and constraints provided, data related to such edges 154, constraints, collinearity, relationships between features (e.g., parallel, perpendicular), and the like, may be determined for use in generation of one or more hypotheses described in further detail herein. For example, such data may include estimations on elevation, relationship between edges 154 (e.g., perpendicular, parallel, collinear), length of edges 154, distances between edges 154, and/or the like.

Qualitative observations would qualify as hard constraints. Quantitative observations, on the other hand, could either qualify as a soft constraint or a hard constraint. Generally, edges 154 are deemed quantitative observations (i.e., evidence parameters) of the object of interest 152. It should be noted that additional quantitative observations may also be determined as discussed in further detail herein. In addition to quantitative observations, qualitative observations (i.e., hard constraints) may also be determined. The qualitative observations may include shared geometric constraints such as a junction between two edges 154, common z-level for two or more eaves, orthogonality of cross components, and/or the like. For example, edges 154a and 154b may have a common z-level for eaves. Edge 154c corresponds to an eave on component 156c, and the edge 154c is collinear with an eave on component 156d. Edges 154e, 154g and 154h may be deemed orthogonal to edge 154f. Edges 154g and 154h may be identified as cross-cascaded relative to the hips of edge 154f (i.e., a possible ridge).

Figure 7A:
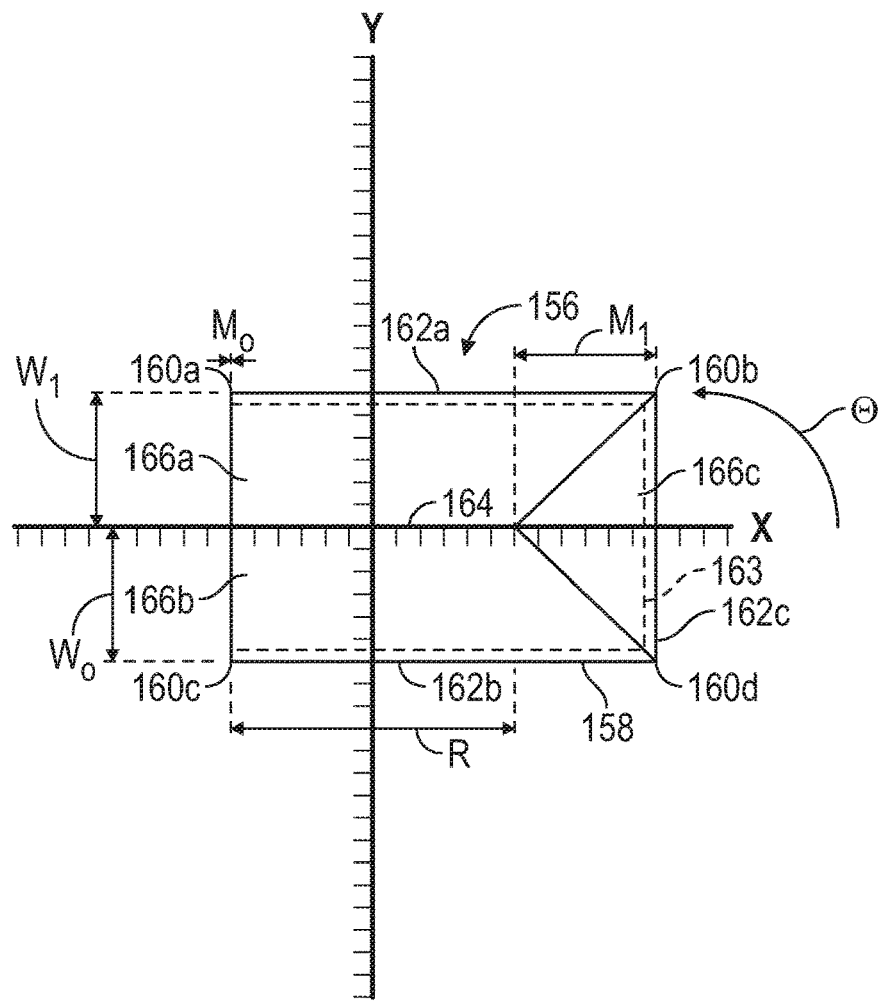
FIG. 7A illustrates a graphical view of an identified component and relative positioning of its edges having a ridge and parallel eaves shown in a local coordinate system, where one end corresponds to a gable configuration and one end corresponds to a hip configuration, in accordance with the present disclosure.
Figure 7B:
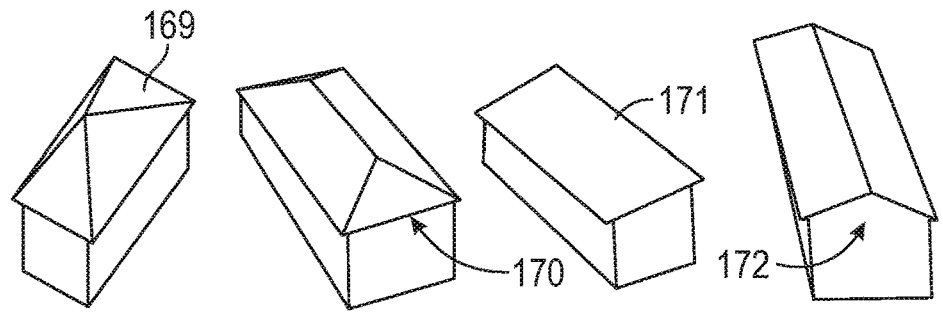
FIG. 7B illustrates a perspective views of a hip configuration of a first roof, a gable configuration of a second roof, a shed configuration of a third roof, and a pyramid configuration of a fourth roof.

Referring to FIGS. 1, 7A and 7B, one or more hypotheses may be generated describing relationships between evidence parameters and constraints as indicated by a step 22 in FIG. 1. The step 22 is also referred to herein as a hypotheses generator 22. To that end, one or more components 156 may be determined using features identified (e.g., edges 154, constraints, relationships between features, etc.), in addition to, evidence parameters and constraints previously determined automatically from the images 12 and/or provided by supervisory feedback 16.

Components 156 may be defined as any solid shape. In relation to roof modeling, each component 156 is generally defined by a roof base 158 having four corners 160 at each endpoint of an eave 162. A wall base 163 may also be included as part of the components 156, as shown in dashed lines in FIG. 7A. Three eaves 162a, 162b and 162c are shown in FIG. 7A. For example, in FIG. 7A, the corners 160a and 160b are the endpoints of eave 162a and the corners 160c and 160d are the endpoints of eave 162b. Additionally, each component 156 may include a ridge 164 parallel to the eaves 162a and 162b. Facets 166a, 166b, and 166c of the component 156 extend from the ridge 164 to the eave 162a, 162b, and 162c. For example, facet 166a extends from the ridge 164 to the eave 162a. Facet 166b extends from the ridge 164 to the eave 162b, and facet 166c extends from the ridge 164 to the eave 162c. Each facet 166 may also be referred to herein as a roof section. More complex roof shapes like a Dutch gable, Mansard, and Gambrel can be defined as components or produced as a boolean combination of the components described herein.

Identification and/or determination of a highest part of a roof, such as a peak on a pyramid roof, an eave on a shed roof, or ridges 164 (on a gable or hip type of roof) may aid in identification of one or more components 156. For example, the ridge 164 indicates an associated component 156 may exist. Identification of four edges 154e, 154f, 154g, and 154h in FIG. 6, as four ridges 164a, 164b, 164c, and 164d, respectively in FIG. 8 may indicate that four components 156a, 156b, 156c, and 156d exist in the object of interest 152. It should be noted that observations are normally not perfect, and this is why the edges 154a-h shown in FIG. 6 are not exactly parallel or perpendicular.

Referring to FIGS. 7A and 7B, the four most common configurations for ridges 164 are the pyramid configuration 169, hip configuration 170, shed configuration 171, and symmetric gable configuration 172. All facets 166 may connect to a common -crest. Using common-crest component parameters, identification of the type of configuration for the ridge 164 (e.g., pyramid, hip, gable, shed, atypical) and/or the geometry of the component 156 may be determined. Common-crest component parameters may include local parameters and/or global parameters. Referring to FIG. 7A, local parameters may include length R of the ridge 164, width $W_0$ between the ridge 164 and the eave 162b, width $W_1$ between the ridge 164 and the eave 162a, medial extensions $M_0$ and $M_1$, height H from the eave 162a to the ridge 164, and/or the like. Global parameters may include absolute coordinates of the common-crest component origin $(x_0, y_0, z_0)$, absolute azimuth e of the component 156 in space.

Figure 7C:
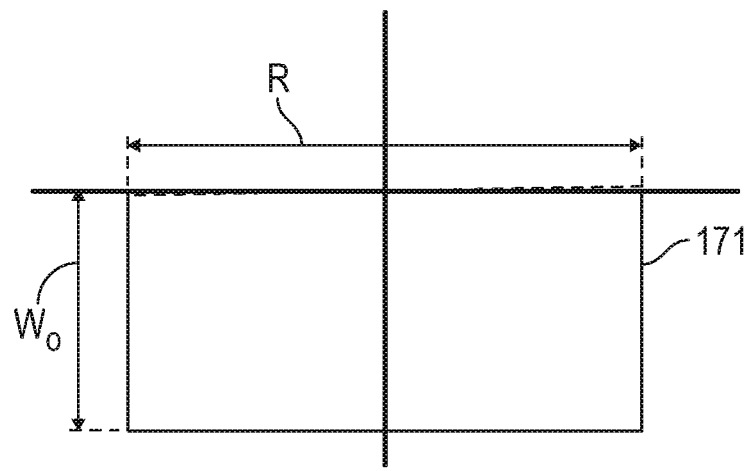
FIG. 7C illustrates a graphical view of a shed component and relative positioning of its edges having two parallel eaves shown in a local coordinate system in accordance with the present disclosure.
Figure 7D:
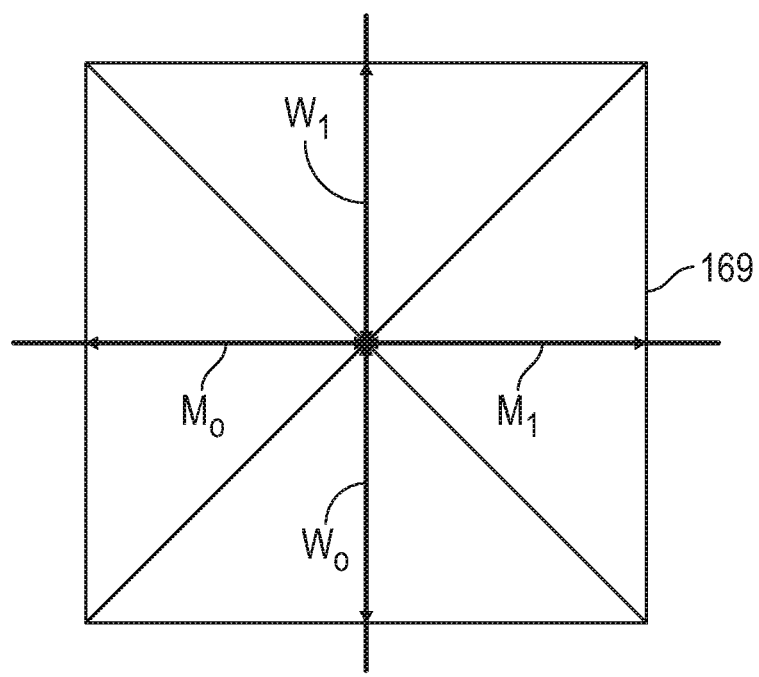
FIG. 7D illustrates a graphical view of a symmetrical pyramid component shown in a local coordinate system with four hip ends and two sets of parallel eaves in accordance with the present disclosure.
Figure 8:
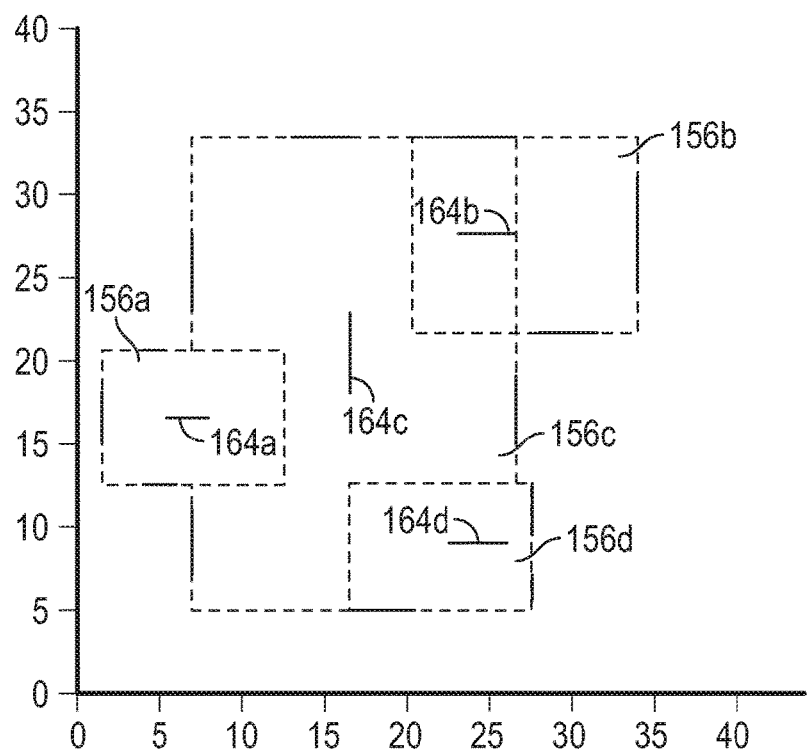
FIG. 8 illustrates a graphical view of observed features overlaying four components of an object of interest identified in accordance with the present disclosure.

For identification of the ridge 164 and associated geometry of the component 156, the image capturing and processing computer system 62 may position the component origin (0, 0, 0) at the center (x, y) of the ridge 164 from a top plan viewpoint as shown in FIG. 7A. Additionally, the component origin (0, 0, 0) may be positioned at the eave level (z). The ridge 164 may be located laterally anywhere between the lateral eaves ($W_i \geq 0$). It should be noted that if the ridge 164 is hypothesized to be positioned directly above one of the eaves 162 ($W_i = 0$), the ridge 164 is identified as an exterior edge, i.e., a role that the ridge 164 is assigned may change depending upon the location of the ridge 164 relative to other edges. The ridge 164 may terminate (e.g., horizontally in a plan view) inside the rectangle forming one of two configurations: the hip configuration 170 wherein $M_1 > 0$, for example; the gable configuration 172 wherein $M_0 = 0$, for example; or an atypical configuration wherein $M_1 < 0$ and the ridge 164 terminates outside of the rectangle formed by the component 156 (not shown). Additionally, if $W_1 = 0$ and $M_0 = 0$ and $M_1 = 0$ the ridge 164 may be in the shed configuration 171 as shown in FIG. 7C. Additionally, the M values could be nonzero and still produce the shed configuration 171, i.e., a ridge becomes an eave and one of the W parameters is zero) with rakes that are not orthogonal to the eaves (a.k.a. a trapezoid that is not a rectangle). As shown in FIG. 7D, the pyramid configuration 169 can be supported by setting (nonzero) $W_1 = W_0 = M_0 = M_1$ and setting R=0. It is also possible to have an asymmetric pyramid configuration in which the M and W values are not all equal.

Figure 9:
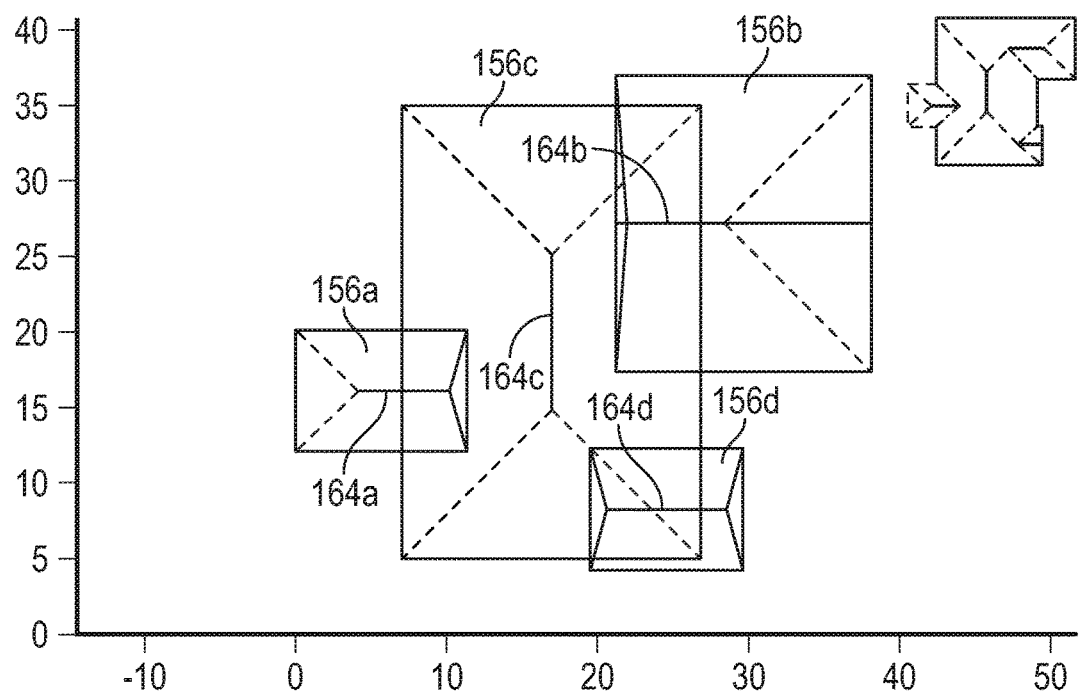
FIG. 9 illustrates a diagrammatic view of the four components of the object of interest illustrated in FIG. 8 with initial hypothesized parameter values, and prior to an iterative optimization process.

The image capturing and processing computer system 62, using the techniques described herein, estimates the number of components 156 and assigns evidence parameters to each component 156. Evidence parameters may include quantitative parameters to be applied to the components 156. Such quantitative parameters may include, but are not limited to, location of endpoints for each ridge 164 (e.g., ridge endpoints of the component 156 are positioned at (x, y, z) and $(x_1, y_1, z_1)$, location of one or more points through eaves 162 (e.g., eave 162a passes through $(x_2, y_2, z_2)$), and/or the like. Additionally, constraint parameters may be assigned to each component 156. Constraint parameters may include qualitative parameters to be applied to the components 156. Constraint parameters may include, but are not limited to, angles between components 156 (e.g., Component A includes a segment between its 180 degree ridge end and its −90 degree side that cross-cascades into Component B), common parameters between components 156 (e.g., Component C and Component D have a common eave elevation), and/or the like. Using evidence parameters, constraint parameters and the estimate of the number of components 156, a hypothesis model may be determined for the object of interest as shown in FIG. 9.

Figure 10A:
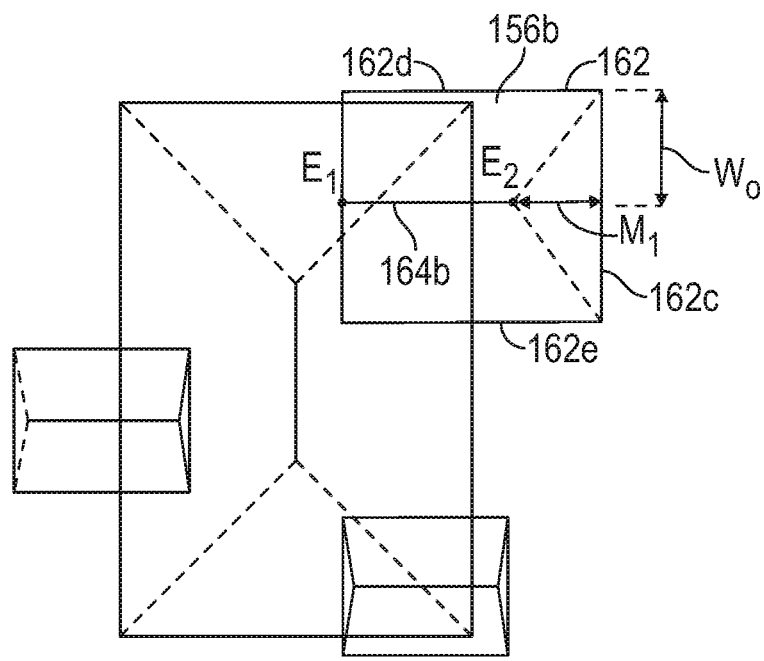
FIG. 10A illustrates a diagrammatic view of the four components of the object of interest illustrated in FIG. 9 subsequent to an initial iterative process in accordance with the present disclosure.
Figure 10B:
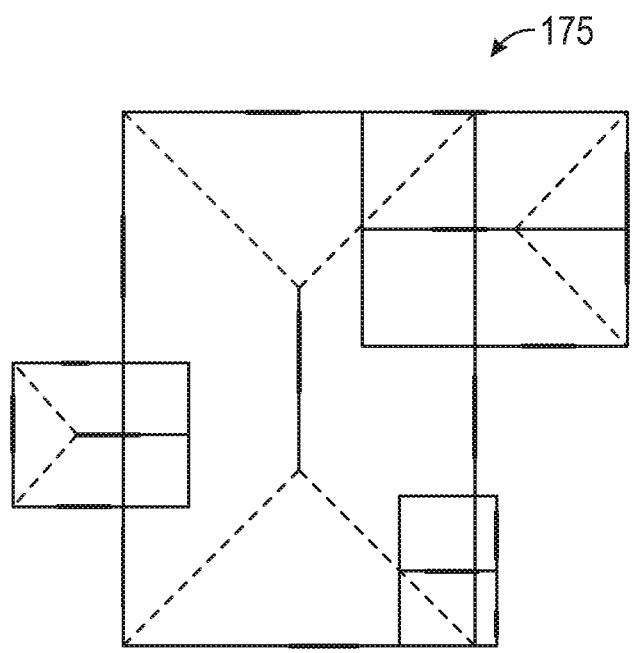
FIG. 10B illustrates a diagrammatic view of the four components of the object of interest illustrated in FIG. 10A subsequent to multiple iterative processes in accordance with the present disclosure.
Figure 11:
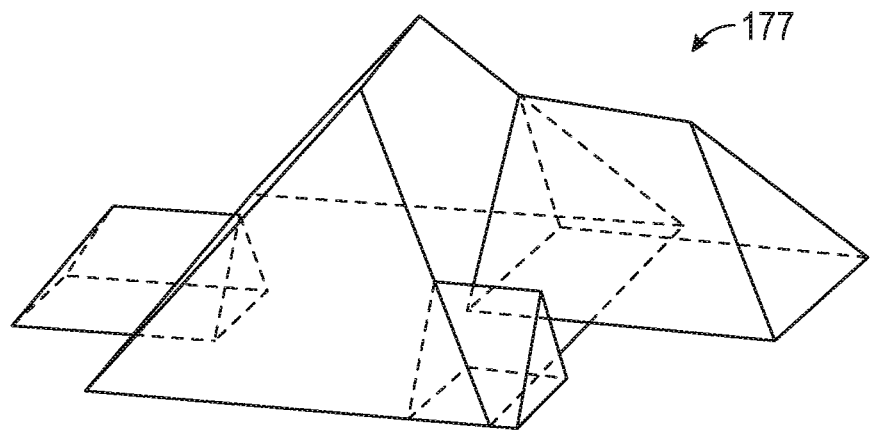
FIG. 11 illustrates a perspective view of the object of interest of FIG. 10B subsequent to a optimized component model to scene modeling process in accordance with the present disclosure.

Referring to FIGS. 10 and 11, once components 156 are identified, each hypothesis may be translated into an iterative optimization process such that each hypothesis model may be optimized to satisfy one or more constraints and fit one or more evidence parameters. Generally, the iterative optimization process may provide for three factors. The first factor is the minimization of error (e.g., between the evidence of edges and the edges in the optimized model. This is subject to the second factor of satisfying one or more constraints (i.e., inequality constraints or equality constraints). Constraints expressed as $g_i(x)$, $c_i$, $h_j(x)$, and $d_j$ are translations of the statements in the hypotheses (e.g., relationship of perpendicular or parallel ridges 164, ridges 164 having hip configuration 170 or gable configuration 172, same elevation for eaves 162, and/or the like). For example, equality constraints and inequality constraints may be:

$$g_i(x)=c_i \text{ for } i=1, \ldots n \text{ (equality constraints)} \quad (EQ. 1)$$

$$h_j(x) \geq d_{j11} \text{ for } j=1, \ldots m \text{ (inequality constraints)} \quad (EQ. 2)$$

The third factor for the iterative optimization process is that the vector x contains all of the parameters of the component 156 (e.g., positions, rotations, lengths, widths, heights, etc.). In some embodiments, the objective function, f(x), may be a weighted squared-error between statements involving observed positions and the resulting model's positions, wherein the weight may be varied based on criteria such as estimated quality of the source, user-specified importance, and/or the like. By solving for each of the three factors, one or more optimized models may be provided from the hypothesis model.

For example, in identifying features of component 156b, an observed midpoint (x,y) of a segment associated with the hip-end eave 162c from the component anchor (e.g., midpoint of the ridge 164b at the z-level of the eave 162) to the hip-end eave may be defined as:

$$0.5*(\text{Length of Ridge})+1.0*(M_1) \quad (EQ. 3)$$

$$(x-x_0)*\cos(A)+(y-y_0)*\sin(A)=R/2+M_1 \quad (EQ. 4)$$

The choice of a midpoint of a segment is only an example. Any point along the hip and eave would work. The midpoint is presumably a better estimate than any single observed point on the eave because the midpoint averages two observed points (the end points of whatever segment was observed). But, for example, any collection of points tagged as "on the eave segment" could be applied, for example, either by: calculating a single best estimate of a point along the eave line, and following the same method described for a single observation's midpoint, or composing the hypothesis (optimization problem) with multiple statements, one for each point derived from an observation to be applied to the optimization. The second approach is more brute-force, but has the advantage of decoupling multiple sources of input about where the eave segment lies.

Additionally, the z-level of the component 156b is observed to be at the z-level of the hip-end segment. As such, this may be defined as:

$$z_0=z \quad (EQ. 5)$$

Further, width of the component 156b may be determined to be a width $W_0 + W_1$ between edges 154i and 154j. The ridge 164b of the component 156b may be determined to pass through the edge 154g of FIG. 6. The endpoints that would be used to determine elevation would come from the observed edge 154g. The constraints are then solved such that:

$$[e_{inequality}, e_{equality}]=f_{constraints}(X) \quad (EQ. 6)$$

The constraints may be expressed in the form of a function of the model parameters that returns a vector for the inequality constraints, and a different vector for the equality constraints, where each element of each vector corresponds to a constraint. The constraints may be expressed such that inequality constraints return non-positive values when the constraint is satisfied, and equality constraints return zero values when the constraint is satisfied. So, a constraint $x_0<100$ would be expressed as $x_0-100$, and a constraint R=24 would be expressed as R−24. Wherein the nonlinear solver attempts to restrict x to values that satisfy $e_{inequality} \leq 0$ and $e_{equality}=0$.

In some embodiments, constraints of components may identify that at least one end of the component 156 is not in the hip configuration 170 (e.g., gable configuration 172, shed configuration). In this example, the constraint is identified within the process as:

$$M_0=0 \quad (EQ. 7)$$

In some embodiments, one constraint of the component 156 may identify that a hip and laterals have equivalent pitch. In this example, the constraint is identified within the process as:

$$M_i=W_0 \quad (EQ. 8)$$

Referring to FIGS. 10A and 10B, using the constraints, evidence and estimation of components 156, the optimization process performs one or more iterations to arrive at the optimized model 175 illustrated in FIG. 10B.

In some embodiments, parameter optimization may be performed on each optimized model 175 as indicated by step 26 in FIG. 1. Parameter optimization may be performed using any suitable optimization algorithm, such as, for example, a general nonlinear solver, or a quadratic solver. For optimized models lacking quadratic or higher order constraints, or hypothesis models 175 lacking either pure equality or inequality constraints, a more tailored solver may be used.

The one or more optimized models 175 and/or the hypothesis models may be scored and/or selected as indicated by step 28 in FIG. 1. In some embodiments, scoring may include ranking of each hypothesis model and/or optimized model 175. For example, one or more optimized models 175 may include noise (e.g., arising from unclear edges 154). The optimized models 175 may be automatically compared relative to one another and/or relative to prior models stored in the model database 30. The model database 30 may include one or more models of the object of interest. Such models may be used to supply evidence and/or constraints in the absence of observed evidence. In another example, models within the model database 30 may be used to supply evidence and/or constraints that may be weighted in the optimization higher or lower as compared to observed evidence. In another example, the models in the model database may be used to provide one or more probabilities to guide the hypothesis generation and/or scoring of the optimized models. For example, the optimized models 175 may be compared against the models within the model database 30. This may increase or decrease the number of optimized models 175 and/or hypothesis models as additional information and/or data related to evidence and/or constraints may be interpreted more than that which was collected via observation (e.g., from the image).

In some embodiments, the model database 30 may provide one or more probability indicators. For example, a higher score may be provided to a first optimized model 175 as the first optimized model 175 and/or components 156 or features of the optimized model 175 are known and/or substantially similar to one or more models within the model database 30. To that end, a lower score may be provided to a second optimized model 175 as the second optimized model 175 and/or components 156 or features of the optimized model 175 are not substantially similar to one or models within the model database 30. Once scored, the optimized models 175 may be ranked according to each score. The scoring can be performed in a variety of ways.

For example, consider components as annotated nodes in a graph, where edge annotations describe shared constraints between components (nodes). Scoring can be performed by graph matching, which again, can be performed in many ways. One way is to discretize a set of graph properties (e.g., rounding-off node and edge parameters to discrete values, and computing discrete relationships between parameters like pitch values in integer increments of inches per foot, etc., that produce outputs from a finite set) into a set of node and edge (discrete) labels. One similarity score on a labeled graph relative to another labeled graph (e.g., from a database) is the Tversky similarity: a number of shared labels normalized by a number of possible shared labels. Node matching is assumed before scoring, so the node pairings should be permuted first, though implausible permutations should be pruned for economy of computation. Another approach is to assign a similarity score to the best match (e.g., Tversky similarity) in a database of known models. There are also methods (such as an "edit distance") that assign a similarity score based on the attributed (rather than discretely labeled) graph directly (assigning a cost to parameter modifications as well as node or edge insertions and deletions), so the particular method used can be optimized further.

In some embodiments, scoring of the optimized models 175 may include scoring by the supervisor to provide accuracy and/or precision for each model, component 156, and or feature within the model. Scoring of the optimized models 175 by the supervisor can be accomplished in a variety of ways. One scenario involves presenting a supervisor with multiple candidates, and letting the supervisor select the top scoring solution. An extension of that is to allow multiple supervisors to vote on candidate solutions. Another modification is to allow a supervisor to select a subsection (subgraph) of a candidate solution that is higher scoring than any of the raw candidates.

In some embodiments, one or more reports 174 having one or more rankings of the optimized models 175 may be provided for supervisory feedback 16 as indicated in FIG. 1. In some embodiments, one or more reports 174 may provide the highest-ranking optimized model 175 for supervisory feedback 16. In some embodiments, the supervisor may elicit additional or modified input to the automatic system 18. The supervisor can provide sufficient feedback with only new or modified input to the automatic system 18. The supervisor does not need to edit anything inside the automatic process. In some embodiments, one or more reports 174 may provide several optimized models 175 ranked from highest probability to lowest probability based on comparison with the model database 30. Supervisory feedback 16 may be provided to select one or more of the optimized models 175 and steps 20, 22, 24, 26 and/or 28 repeated again. The supervisor does not need to provide any feedback involving operations of the optimized models 175 themselves.

Referring to FIG. 1, the output of the model scoring and selection, step 28, may be a model in the form of a collection of components 156 and associated parameters. At this stage, the hypothesis model and/or optimized model 175 may consist of a list of components 156 that includes absolute locations (anchor (x, y, z,) and azimuth) and relative parameters (e.g., length, width, height). The hypothesis model and/or optimized model 175 may be rendered using the list of components 156, absolute locations, and relative parameters in the graph to scene step 31 to form a scene model 177 shown in FIG. 11. The scene model 177 may be parameterized to absolute components. The scene model 177 may be composed with absolute coordinates. Further, a three dimensional model 34 of the object of interest may be formed from the scene model 177 in step 32 using standard solid model Boolean operations, such as a "Union" operation, an "Intersection" operation, and "Difference" operation. Additionally, surface polygons (also known as a boundary representation) may be extracted. The three dimensional model 34 of the object of interest may be imported into third party system without additional manipulation of the model 34 by a supervisor.

Figure 12:
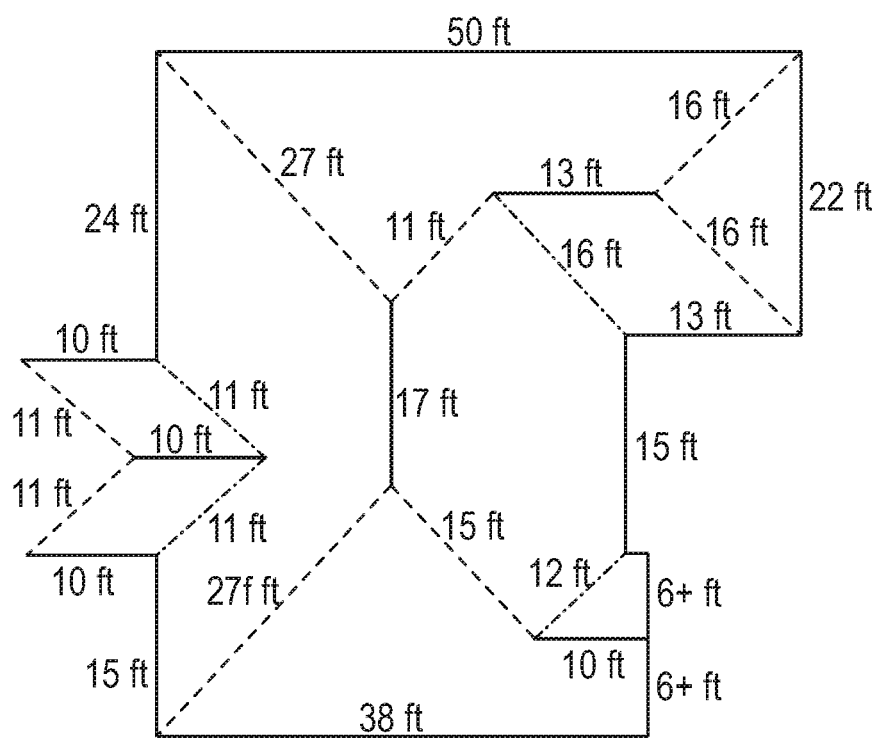
FIG. 12 illustrates a diagrammatic view of the object of interest of FIG. 11.

Referring to FIGS. 1 and 12, in some embodiments, once the model 34 is formed further analysis of the object of interest 152 may be performed as illustrated in FIG. 12. In some embodiments, such further analysis may be provided in one or more reports 180. For example, when the present disclosure is used for analyzing a roof of a building and the data points include the three-dimensional position of the part of the object represented by the data points, data points representing the outer boundaries can be used to calculate the perimeter of the roof; data points representing a ridge and a valley bordering a roof section can be used to calculate a pitch of the roof section. These techniques can be used to calculate a variety of roof features, roof dimensions, and/or roof pitch of sections of the roof. The roof can be saved and provided to a third party software program (e.g., CAD). Data indicative of the roof can be stored in a geospatial database or a separate database. The data can be provided and stored in the geospatial database or separate database in a variety of forms. For example, the calculated data and the data file of the roof outline can be saved in the geospatial database or a separate database that may or may not be correlated with the geospatial database. Further, the latitude and longitude of the data points can be used to determine a physical address of a particular object of interest (e.g., building) and such address can be stored with the calculated data. In other embodiments, information that can be used to derive a three-dimensional model of the roof can be stored in the geospatial database or separate database. For example, geolocated vertices, segments, polygons or polyhedral surfaces as native objects with associated/derived metadata can be stored. This data can represent all or part of the model 34, or components (e.g., the output of the model scoring/ selection 28). Non-geospatial metadata may also be stored in including the relationships/constraints between components in a solid model description of the model 34 in a "CAD" data structure, i.e., one with a local rectangular coordinate system. Some of the derived metadata (e.g., pitch and area of the facet, or length of the segment) can be computed directly from the geometry objects stored within the database. The model data, calculated data, image data and the address can be correlated together, and automatically used to populate a template thereby preparing a predetermined report about the object of interest including one or more images of the object of interest and calculated data about the object of interest. This methodology can be executed by one or more processors as discussed herein to identify and obtain information about objects of interest for a variety of purposes. For example, the methodology can be executed by one or more processors to generate reports for a plurality of objects of interest, without manual or human intervention. Thus, the presently described methodology provides a performance increase over conventional methods for generating object reports, as well as an enhancement to the operation of the processor when generating reports for one or more objects of interest.

In some embodiment, a customer and/or contractor may receive a report regarding evaluation of object(s) of interest and/or feature(s) of interest. For example, the customer and/or contractor may receive a report regarding evaluation of the roof. Referring to FIGS. 1, 3 and 4, the program logic 120 may provide for one or more of the processors 108 interfacing with the image capturing and processing computer system 62 over the network 110 to provide one or more roof reports 180.

Generally, the roof report 180 may include, but is not limited to, one or more data sets regarding roof pitch, total area, eave length, hip length, ridge length, valley length, number of box vents, and/or the like. Additionally, the roof report may include one or more images 12 of the roof 130. Such images 12 or models 30 or 34 may be automatically provided to the roof report via extraction of the roof 130 as described herein. Additionally, the roof report 140 may include a customer information data set (e.g., customer name and contact information), estimated area detail, contractor data set (e.g., contractor name and contract information), and/or the like.

In some embodiments, determination, analysis and measurements of data associated with the object of interest 152 and/or features of interest may be catalogued and stored in one or more database for retrieval. Data catalogued and stored associated with the object of interest 152 and/or feature of interest may include, but is not limited to, location data (e.g., object of interest, each point of the object of interest), date and/or time of image creation, algorithms used, measurements, metadata, footprint, and/or the like. For example, boundaries associated with the object of interest 152 and/or feature of interest may be spatially catalogued using location (e.g., coordinate data, address). In some embodiments, data related to the roof may be stored in the model database 30 for subsequent evaluation of one or more objects of interest.

With respect to roofs, many roofs can be three-dimensionally modeled as a combination of one or more components configured with ridges having gable and/or hip ends, as pyramids, or sheds. A roof model of a symmetrical gable roof, constructed in accordance with the present disclosure, will include one component having two gable ends to its ridge. A roof model of a symmetrical hip roof, constructed in accordance with the present disclosure, will include a component with its ridge having two hip ends. Roofs may also be constructed with a main mass of a house topped with a hip roof, with smaller gables added as an embellishment for entry porches, dormers and garages. A roof model of these types of roofs, constructed in accordance with the present disclosure, will include a combination of at least one component with two hip ends to its ridge, and at least one component with at least one gable end to its ridge. Other combinations of components configured appropriately, with gable or hip ends to ridges, as sheds or as pyramids, can be used to create and/or generate roof models.

Once a user obtains the roof report, such user may use the roof report to repair and/or reconstruct the roof.

In some embodiments, the present disclosure describes one or more non-transitory computer readable medium storing a set of computer executable instructions for running on one or more computer systems that when executed cause the one or more computer systems to: analyzing data points indicative of a roof to locate evidence of at least one predetermined roof component, soft constraints and hard constraints related to the at least one predetermined roof component; identifying at least one component of the roof using the evidence of the at least one predetermined roof component, the soft constraints and the hard constraints, the component defined as a rectangular base and at least one eave positioned parallel to the predetermined roof component; determining at least one type of roof configuration for the at least one component; determining at least one hypothesis model of the roof including the at least one component using the evidence of soft constraints and hard constraints. These embodiments improve upon the previous systems by involving the use of an alternative framework for roof modeling (i.e., solid model components), which has advantages over the wireframe based approach set forth in Paragraph [0004] and pre-wireframe based approach set forth in Paragraph [0005]. The advantages include such properties as no wireframe specification, a single framework (at a higher abstraction level), smaller models (fewer parameters, or robustness through redundancy), decoupled parameters (suitable for comparing across models), and explicitly declared high-level constraints. Roofs modeled this way will always contain planar surfaces.

In some embodiments, the present disclosure describes an automated method performed by at least one processor running computer executable instructions stored on at least one non-transitory computer readable medium, comprising: classifying a first component and a second component of a roof with data points being part of, or extracted from at least one image, the first component and the second component having a ridge, at least one eave parallel to the ridge and a rectangular base; identifying evidence of a soft constraint and a hard constraint via the data points and associating the evidence with the first component and the second component; generating at least one hypothesis model of the roof using relationships between the first component and the second component, the soft constraint and the hard constraint; transforming the hypothesis model into a three dimensional model; analyzing the three dimensional model for edges representing outer boundaries of the roof; and, generating a roof report of the roof. These embodiments provide a technological improvement by using an alternative framework for roof modeling (i.e., solid model components), which has advantages over the wireframe based approach set forth in Paragraph [0004] and pre-wireframe based approach set forth in Paragraph [0005]. The advantages include such properties as no wireframe specification, a single framework (at a higher abstraction level), smaller models (fewer parameters, or robustness through redundancy), decoupled parameters (suitable for comparing across models), and explicitly declared high-level constraints. Further, these embodiments produce a three-dimensional model that may be represented as a wireframe of planar facets based on the resulting solid model (i.e., without ever specifying a wireframe directly), sufficient for generating a roof report.

In some embodiments, the present disclosure describes an automated computerized system, comprising: a computer system executing image display and analysis software reading: at least one image depicting an object of interest; supervisory feedback of at least one hard constraint or at least one soft constraint related to the object of interest in the image; and wherein the image display and analysis software executed by the computer system determines at least one hypothesis model having at least one component, the component formed of a ridge, at least one eave, and a rectangular base, and the image display and analysis software performs at least one iterative optimization process on the hypothesis model such that the hypothesis model satisfies all of the at least one hard constraint or the at least one soft constraint. These embodiments provide a technological improvement by applying user input to guide the modeling process via declaring constraints, not by a user making procedural corrections to the model (e.g., by changing its parameters).

Further, the supervisor may apply the constraints without referencing the current state of the model, since constraint-to-model mapping is part of the automatic system. The previous systems set forth in Paragraphs and [0005] above apply operator input directly to the model under detection/estimation. That is, the user directs their input at a representation of the model, to either specify the model (e.g., the existence of vertices, segments, and polygons in [0004]) or the modification of a model (e.g., in an effort to enforce coplanarity requirement in [0004] or the selection of a polygon and editing of its parameters or its topological relationships to the rest of the model in Paragraph [0005]).

From the above description, it is clear that the inventive concepts disclosed and claimed herein are technological improvements over the prior art, and are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. One or more non-transitory computer readable medium storing a set of computer executable instructions for running on one or more computer systems that when executed cause the one or more computer systems to:
    determine a hypothesis model of a roof by:
        analyzing data points indicative of a roof to locate evidence of predetermined roof components, soft constraints and hard constraints related to the predetermined roof components, the hard constraints being conditions of variables within an objective function for modeling the roof that are required to be satisfied, the soft constraints being conditions of the objective function of the roof that do not have to be satisfied, but contribute to the objective function of the roof in an optimization of the objective function;
        identifying the predetermined roof components using the evidence of the predetermined roof components, the soft constraints and the hard constraints, the predetermined roof components defined as a rectangular base and at least one eave;
        for each of the predetermined roof components, determining at least one type of roof configuration, and geometry of the roof component using common-crest component parameters; and
        determining an overlapping relationship between the multiple predetermined roof components using the evidence of soft constraints and hard constraints; and
    translating the hypothesis model into a three-dimensional model of the roof using an iterative optimization process.

2. The one or more non-transitory computer readable medium storing the set of computer executable instructions for running on one or more computer systems of claim 1, wherein the common-crest component parameters are sufficient to distinguish hip and gable ends, sheds and pyramids.

3. The one or more non-transitory computer readable medium storing the set of computer executable instructions for running on one or more computer systems of claim 1, wherein a first hypothesis model and a second hypothesis model of the roof are determined.

4. The one or more non-transitory computer readable medium storing the set of computer executable instructions for running on one or more computer systems of claim 3, further comprising determining a first score for the first hypothesis model and a second score for the second hypothesis model, the first score and the second score being different.

5. The one or more non-transitory computer readable medium storing the set of computer executable instructions for running on one or more computer systems of claim 4, further comprising ranking the first score and the second score and providing each score in a report.

6. The one or more non-transitory computer readable medium storing the set of computer executable instructions for running on one or more computer systems of claim 4, wherein the determination of the score includes comparison of the first hypothesis model and the second hypothesis model with at least one model in a model database.

7. The one or more non-transitory computer readable medium storing the set of computer executable instructions for running on one or more computer systems of claim 1, further comprising performing at least one iterative optimization process such that the hypothesis model satisfies all of the conditions for the hard constraint and the soft constraint for the at least one component.

8. The one or more non-transitory computer readable medium storing the set of computer executable instructions for running on one or more computer systems of claim 1, wherein the three-dimensional model of the hypothesis model is configured for importation within third party software without manual manipulation.

9. The one or more non-transitory computer readable medium storing the set of computer executable instructions for running on one or more computer systems of claim 1, wherein the three-dimensional model of the hypothesis model is configured for importation within CAD software without manual manipulation.

10. The one or more non-transitory computer readable medium storing the set of computer executable instructions for running on one or more computer systems of claim 1, further comprising generating a roof report having at least one image showing the three-dimensional model and an estimated roof pitch, the three-dimensional model being an optimized component-based model.

11. The one or more non-transitory computer readable medium storing the set of computer executable instructions for running on one or more computer system of claim 1, further comprising cataloguing at least one of the hypothesis model and the three-dimensional model of the roof within a model database.

12. An automated method performed by at least one processor running computer executable instructions stored on at least one non-transitory computer readable medium, comprising:
    generating at least one hypothesis model of the roof by:
        classifying a first component and a second component of a roof with data points being part of, or extracted from at least one image, the first component and the second component having a ridge, at least one eave parallel to the ridge and a rectangular base, the ridge of the first component being a first ridge, and the ridge of the second component being a second ridge;
        determining type of configuration of the first ridge and the second ridge using common-crest component parameters;
        identifying evidence of a soft constraint and a hard constraint via the data points and associating the evidence with the first component and the second component;

determining an overlapping relationship between the first component and the second component;
transforming the hypothesis model into a three-dimensional model using an iterative optimization process;
analyzing the three-dimensional model for edges representing outer boundaries of the roof; and,
generating a roof report of the roof.

13. The automated method of claim 12, wherein at least some of the data points are part of a point cloud.

14. The automated method of claim 12, further comprising collecting evidence and constraints via supervisory feedback of one or more of data points, feature derived from the data points, elements of a hypothesis model, elements of an optimized component based model, or elements of an object model.

15. The automated method of claim 14, further comprising altering at least one hypothesis model via the evidence and constraints provided by the supervisory feedback.

16. The automated method of claim 12, wherein at least one of the hypothesis model is classified and stored in a model database.

17. The automated method of claim 12, wherein generating at least one hypothesis model of the roof comprises generating a first hypothesis model and a second hypothesis model of the roof, and further comprising determining a first score for the first hypothesis model and a second score for the second hypothesis model by at least comparing the first hypothesis model and the second hypothesis model with at least one model stored within a model database, the first score and the second score being different.

18. An automated computerized system, comprising:
a computer system executing image display and analysis software reading:
 at least one image depicting an object of interest;
 supervisory feedback of at least one hard constraint or at least one soft constraint related to the object of interest in the image; and
wherein the image display and analysis software executed by the computer system determines at least one hypothesis model having multiple components and information indicative of an overlapping relationship between the components, the components formed of a ridge, at least one eave, and a rectangular base, and the image display and analysis software performs at least one iterative optimization process on the hypothesis model such that the hypothesis model satisfies all of the at least one hard constraint or the at least one soft constraint, and wherein the hypothesis model is provided in a form of a list of the components including absolute locations and relative parameters of the components and rendered to form a scene model, the scene model parameterized to absolute components, and wherein the image display and analysis software executed by the computer system forms a three-dimensional model from the scene model, the three dimensional model capable of importation into a CAD program without additional supervisory feedback to the three-dimensional model.

* * * * *

UNITED STATES PATENT AND TRADEMARK OFFICE
CERTIFICATE OF CORRECTION

PATENT NO. : 10,503,843 B2  
APPLICATION NO. : 15/907987  
DATED : December 10, 2019  
INVENTOR(S) : John Francis Keane Page 1 of 1

It is certified that error appears in the above-identified patent and that said Letters Patent is hereby corrected as shown below:

In the Specification  
Column 20, Line 2: After "azimuth" delete "e" and replace with -- $\theta$ --

Signed and Sealed this  
Eleventh Day of February, 2020

Andrei Iancu  
*Director of the United States Patent and Trademark Office*